United States Patent [19]
Tanishima et al.

[11] Patent Number: 5,877,907
[45] Date of Patent: Mar. 2, 1999

[54] APPARATUS AND METHOD FOR DEMODULATING DATA SIGNALS READ FROM A RECORDING MEDIUM

[75] Inventors: Hideaki Tanishima; Noriko Tomita; Masato Tomita, all of Kasugai, Japan

[73] Assignee: Fujitsu Limited, Kanagawa, Japan

[21] Appl. No.: 723,669

[22] Filed: Sep. 30, 1996

[30]   Foreign Application Priority Data

Nov. 22, 1995   [JP]   Japan ................................... 7-304667

[51] Int. Cl.$^6$ .............................. G11B 20/06; G11B 5/09
[52] U.S. Cl. ................................. 360/30; 369/48
[58] Field of Search .................. 369/275.3, 124, 369/47, 48, 50, 58, 30, 32, 33; 360/30, 29, 32, 27, 28

[56]   References Cited

U.S. PATENT DOCUMENTS

| | | | |
|---|---|---|---|
| 5,210,733 | 5/1993 | Yamaguchi et al. | 369/48 |
| 5,388,090 | 2/1995 | Hoshino et al. | 369/275.3 |
| 5,425,014 | 6/1995 | Tsuyuguchi et al. | 369/48 |
| 5,559,777 | 9/1996 | Maeda et al. | 369/50 |

FOREIGN PATENT DOCUMENTS 83107858   3/1996   Taiwan .

*Primary Examiner*—Paul W. Huber
*Attorney, Agent, or Firm*—Nikaido Marmelstein Murray & Oram, LLP

[57]   ABSTRACT

An apparatus for demodulating a data signal read from a recording medium, in which data is recorded on at least a portion of the recording medium. The data is recorded using a recording system having a substantially constant linear velocity. In this manner, the recording medium is rotated at a substantially constant speed during the reading of data signals such that one of a frequency and an amplitude of the read data signal varies. The apparatus includes a signal processor for processing the read data signal in response to a change in one of the frequency and amplitude to produce a processed data signal suitable for demodulation. Once the processed data signal is produced, a demodulator operates to demodulate the data signal and to produce a demodulated data signal.

23 Claims, 19 Drawing Sheets

APPARATUS AND METHOD FOR DEMODULATING DATA SIGNALS READ FROM A RECORDING MEDIUM

BACKGROUND OF THE INVENTION

1. Field of the Invention

The present invention relates generally to a data reading apparatus for reading data from a recording medium such as a CD-ROM (Compact Disk-Read Only Memory) or DVD (Digital Video Disk). More particularly, this invention relates to a data demodulating apparatus which demodulates data read from a recording medium where data has been recorded in either a CLV (Constant Linear Velocity) or a ZCLV (Zone Constant Linear Velocity) system, while controlling the rotation of the recording medium at a substantially constant speed.

2. Description of the Related Art

Recently, attention has been paid to the development of optical disks to effectively record data for multimedia. Known optical disks include, for example, LDs (Laser Disks), CD-ROMs, MDs (Mini Disks) and DVDs. DVDs are about the same size as CD-ROMs, however, their capacity is about 7.5 times greater. From the conventional viewpoint of increasing the memory capacity of recording media as well as processing speeds, a data processing system would need a larger data reading apparatus that has improved data reading rates from optical disks such as a DVD. However, portable personal computers will generally require data reading apparatus that is relatively compact and which consumes less power than conventional data reading apparatuses used in desk-top computers.

A conventional data reading apparatus has a motor for rotating an optical disk and a pickup apparatus for optically reading digital data recorded on that optical disk. The pickup apparatus reads recorded data from an optical disk and outputs it as an analog signal. The data reading apparatus further has an amplifier, which amplifies an analog signal to provide an amplified analog signal having a predetermined amplitude value. The data reading apparatus compares the voltage level of the amplified analog signal with a predetermined threshold value to convert the analog signal to a binarized digital pulse signal and demodulates the digital pulse signal to produce a read data signal.

The aforementioned data reading apparatus reads data in accordance with an optical disk reading system, such as the CLV, ZCLV or CAV (Constant Angular Velocity) system (i.e., the recording system of recording data on an optical disk).

In the CLV system, data is recorded on an optical disk in the format shown in FIG. 1. Each of a plurality of tracks T arranged concentrically on the disk has a plurality of sectors each consisting of an address area A1 and a data area A2. The lengths of the individual sectors are designed to be constant regardless of the position of the tracks T which are located at inner or outer peripheries of the tracks. In reading data from such a formatted disk, the rotational speed of the disk is controlled in accordance with the position of the pickup apparatus in the radial direction of the disk. As shown in FIG. 2A, as the pickup apparatus moves inwardly on the disk from the outside, the rotational speed of the disk is increased. This change in speed permits data stored in the individual sectors to be read at the same linear velocity. FIG. 2B is a graph showing the relationship between the data rate indicative of the amount of data read by the pickup apparatus per unit time and the track position. This graph shows that at a constant linear velocity, the data rate (i.e., the frequency and amplitude of a read data signal) is constant irrespective of the position of the pickup apparatus on a disk. This is because the lengths of data recording pits in the sectors are designed to be constant with respect to the constant linear velocity, regardless of whether the pickup apparatus is positioned on the inner or outer tracks on the disk, as shown in FIG. 2C.

In the ZCLV system, data is recorded in the format shown in FIG. 3. The disk area is separated to a plurality of zones Z in the radial direction of the disk, with a plurality of tracks T assigned to each zone. The lengths of the individual sectors included in an outer track T are designed to be longer than those of the individual sectors included in an inner track T. Further, the range of the lengths of the individual sectors which vary from one track T to another in each zone Z are designed to be substantially the same zone by zone. Therefore, the sectors of each track T are radially arranged in the radial direction of the disk in each zone Z. In reading data from such a formatted disk, the rotational speed of the disk is controlled zone by zone in accordance with the position of the pickup apparatus in the radial direction of the disk.

As shown in FIG. 4A, when the pickup apparatus moves inward from the outside of the disk, the rotational speed of the disk is increased stepwise for each zone Z. This stepwise speed change permits data stored in the individual sectors to be read at the same linear velocity. As shown in FIG. 4B, at a constant linear velocity, the data rate (the frequency and amplitude of a read data signal) is approximately constant irrespective of the position of the pickup apparatus on a disk. Although the lengths of recording pits vary in each zone, the range of the change is the same for each zone, as shown in FIG. 4C. Further, the lengths of the individual sectors change in each zone may change, however, the range of the change is the same for each zone.

In the CAV system, data is recorded in the format shown in FIG. 5. The lengths of individual sectors included in the individual tracks T arranged on a disk are so designed to become longer toward the outer periphery of the disk. Accordingly, the sectors of each track T are radially arranged in the radial direction of the disk. In reading data from such a formatted disk, the rotational speed of the disk is kept constant regardless of the position of the pickup apparatus on the disk as illustrated in FIG. 6A. Further, FIG. 6B shows that at a constant rotational speed, the data rate (the frequency and amplitude of a read data signal) is approximately constant irrespective of the position of the pickup apparatus on a disk. FIG. 6C shows the lengths of recording pits in an outer sector on the disk are longer than those of recording pits in an inner sector. Therefore, the lengths of the individual sectors are also longer toward the outer periphery of the disk.

As apparent from the above-described recording systems, the CLV system that has individual sectors with lengths that are the same provides a higher disk recording density. In the case where data is recorded on disks of the same size in different systems, therefore, a disk which is recorded using the CLV system is advantageous due to its larger memory capacity.

The ZCLV system simplifies the control on the number of rotations of the disk driving motor while maintaining the advantageous features of a CLV system which has larger disk memory capacity. The ZCLV system has an intermediate disk recording density that lies between those of the CLV system and the CAV system. The CAV system typically has the lowest disk recording density of data recording systems.

Data reading apparatuses that deal with recording mediums like a CD-ROM or DVD typically employ either a CLV or a ZCLV system, which generally provides a higher recording density. Therefore, data may be recorded on a disk in accordance with the CLV or ZCLV system while the pickup apparatus reads data under the disk rotation control according to the CLV or ZCLV system.

To improve the speed at which data is read by a data reading apparatus according to the CLV or ZCLV system, the rotational speed of a disk is typically increased. Increasing the rotational speed of a disk in the CLV system will generally demand a spontaneous change in the rotational speed of the disk at the time of seeking a sector located apart from a sector on the disk in the radial direction. To meet this demand, the motor for rotating the disk should secure a sufficient driving torque. This will generally necessitate the enlargement of the motor and an increase in the power consumed by the data reading apparatus.

To remedy this problem, data may be read from a disk, which has data recorded using the CLV or ZCLV system, while rotating the disk at a constant speed under the rotational control of the CAV system. This arrangement facilitates the implementation of a motor which has a relatively small driving torque. In this manner, the physical size of the motor and the power consumption of the data reading apparatus may both be reduced. Rotating a disk at a constant speed however does not ensure a constant linear velocity. That is, the linear velocity at the time of reading data from an inner sector on a disk differs from the linear velocity at the time of reading data from an outer sector. As shown in FIG. 7, therefore, the pickup apparatus supplies the amplifier with an analog signal whose frequency F increases toward the outer periphery of the disk, and has the maximum ratio of 1:2.5. Further, as illustrated in FIG. 8, the pickup apparatus sends the amplifier an analog signal whose amplitude W decreases toward the outer periphery of the disk.

In the case where data is read from a disk, which has data recorded in the ZCLV system and under the rotational control of a CAV system, the pickup apparatus sends the amplifier an analog signal whose frequency F drops by a given level at the boundaries of the individual zones and gradually increases toward the outer periphery of the disk. The pickup apparatus also sends the amplifier an analog signal whose amplitude W increases by a given value at the boundaries of the individual zones and decreases toward the outer periphery of the disk.

It should therefore be appreciated that it is very difficult to demodulate an analog signal having a varying frequency and amplitude, and thus to accurately acquire a predetermined read data signal. Further, it is practically difficult to read data from a disk that is recorded using a CLV or ZCLV system while having disk rotation controlled by a CAV system.

SUMMARY OF THE INVENTION

Broadly speaking, the present invention relates to a data reading apparatus which can accurately acquire predetermined read data even when a recording medium having data recorded in either the CLV or ZCLV system is controlled at a constant rotational speed. The present invention can be implemented in numerous ways, including as an apparatus and a method.

In one aspect of the invention, a data demodulating apparatus for demodulating a data signal read from a recording medium is disclosed. The recording medium will preferably have data recorded on at least a portion of the recording medium, and the data is preferably recorded using a recording system having a substantially constant linear velocity. In this manner, the recording medium is rotated at a substantially constant speed during the reading of data signals such that one of a frequency and an amplitude of the read data signal varies. The apparatus includes a signal processor for processing the read data signal in response to a change in one of the frequency and amplitude to produce a processed data signal suitable for demodulation. Once the processed data signal is produced, a demodulator operates to demodulate the data signal to produce a demodulated data signal.

In another aspect of the invention, a method of demodulating a data signal read from a recording medium is disclosed. The recording medium will preferably have data recorded on at least a part of the recording medium, and the data is preferably recorded using a recording system having a substantially constant linear velocity. The method includes the operations of rotating the recording medium at a substantially constant speed, and reading data from the recording medium in an analog signal form. The analog signal form will preferably have at least one of a frequency and an amplitude which will vary based on the data reading position on the recording medium. According to the method, the analog signal amplitude is maintained substantially constant and is converted to a digital pulse signal while maintaining the frequency of the analog signal. The digital pulse signal is then demodulated to produce demodulate data.

Other aspects and advantages of the invention will become apparent from the following description, taken in conjunction with the accompanying drawings, which illustrates by way of example the principals of the invention.

BRIEF DESCRIPTION OF THE DRAWINGS

The invention, together with objects and advantages thereof, may best be understood by reference to the following description of the presently preferred embodiments together with the accompanying drawings, and in which.

DETAILED DESCRIPTION OF THE PREFERRED EMBODIMENTS

Figure 1:
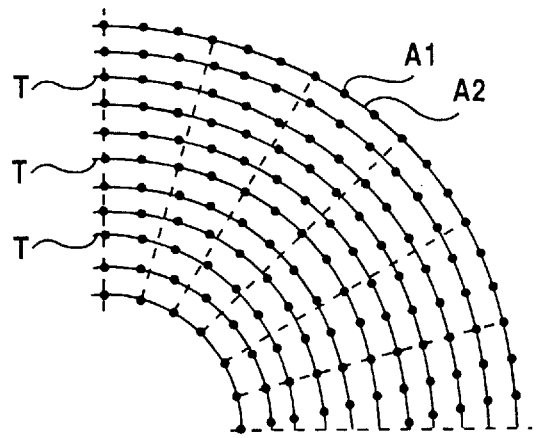
FIG. 1 is a diagram illustrating the disk format according to the CLV system.
Figure 2A:
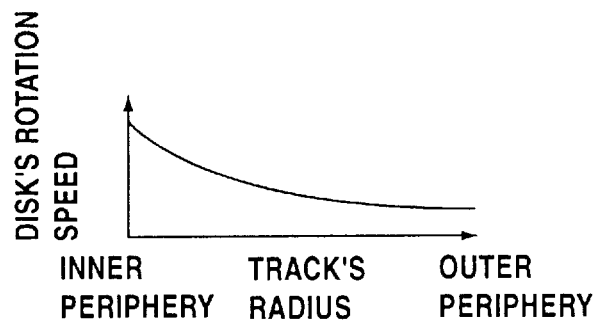
FIG. 2A is a graph showing the relationship between a disk's rotational speed under the rotational control of a CLV system, and the pickup position on a disk.
Figure 2B:
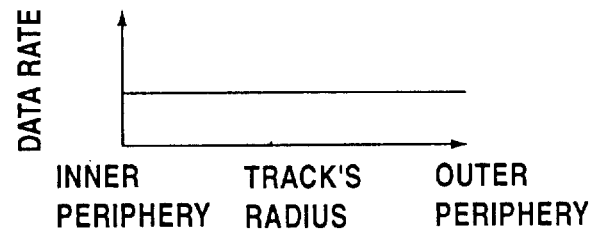
FIG. 2B is a graph showing the relationship between the output data rate of a pickup apparatus and the pickup position of on a disk.
Figure 2C:
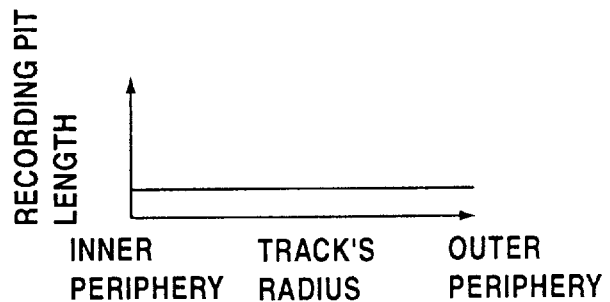
FIG. 2C is a graph showing the relationship between the pit lengths of data recorded in sectors and the pickup position on a disk.
Figure 3:
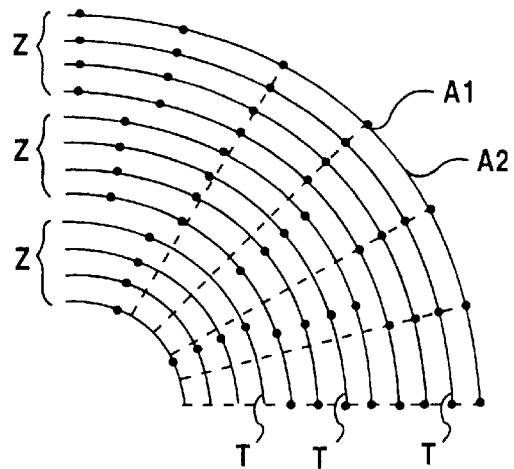
FIG. 3 is a diagram illustrating a disk formatted using a ZCLV system.
Figure 4A:
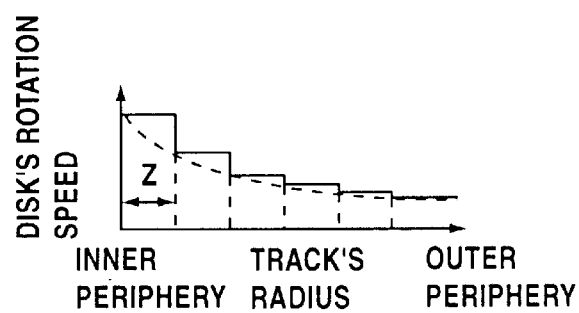
FIG. 4A is a graph showing the relationship between the rotational speed of a disk that has its rotation controlled using a ZCLV system, and the pickup position on a disk.
Figure 4B:
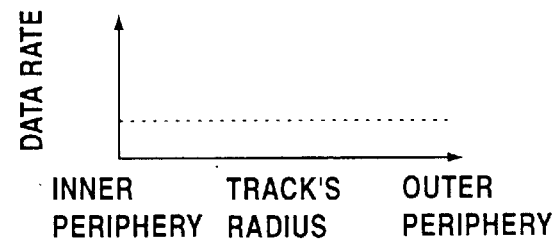
FIG. 4B is a graph showing the relationship between the output data rate of a pickup apparatus and the pickup position on a disk.
Figure 4C:
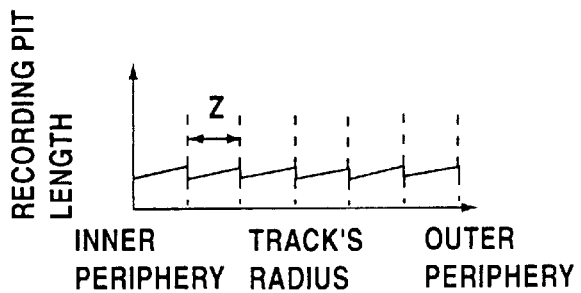
FIG. 4C is a graph showing the relationship between the pit lengths of data recorded in sectors and the pickup position on a disk.
Figure 5:
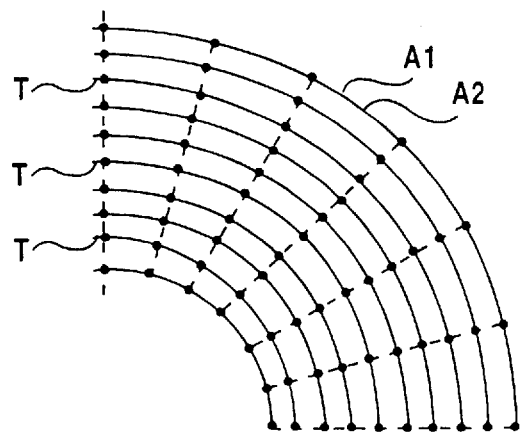
FIG. 5 is a diagram illustrating a disk formatted according to the CAV system.
Figure 6A:
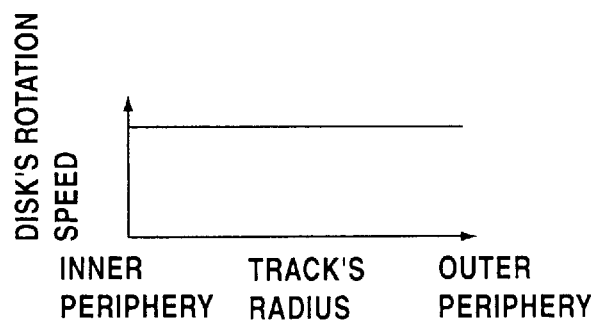
FIG. 6A is a graph showing the relationship between a disk's rotational speed under the rotational control of a CAV system, and the pickup position on a disk.
Figure 6B:
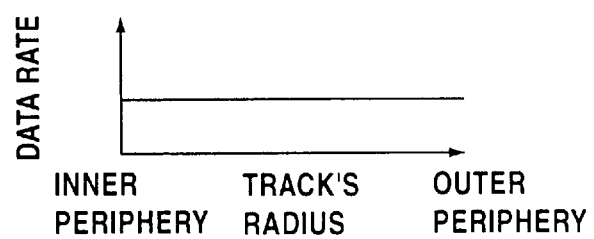
FIG. 6B is a graph showing the relationship between the output data rate of a pickup apparatus and the pickup position on a disk.
Figure 6C:
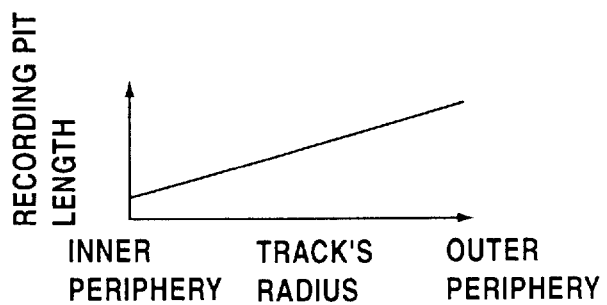
FIG. 6C is a graph showing the relationship between the pit lengths of data recorded in sectors the pickup position on a disk.
Figure 7:
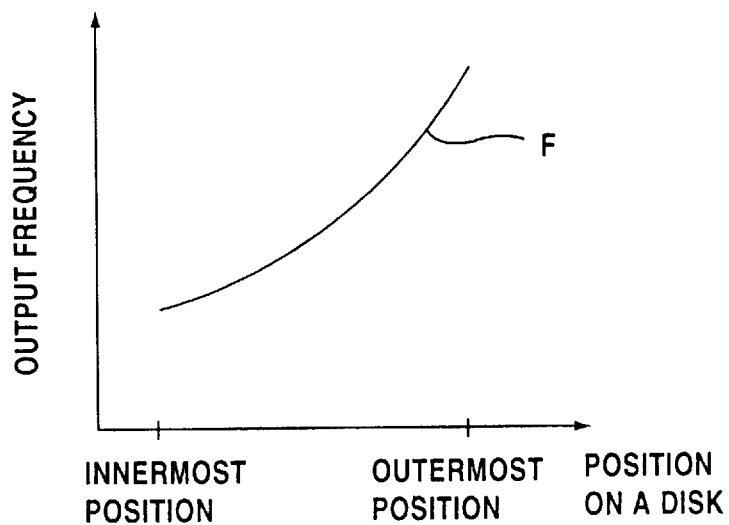
FIG. 7 is a graph showing the relationship between the output frequency of the pickup apparatus when a disk having data recorded in the CLV system is rotated at a constant speed and the pickup position on the disk.
Figure 8:
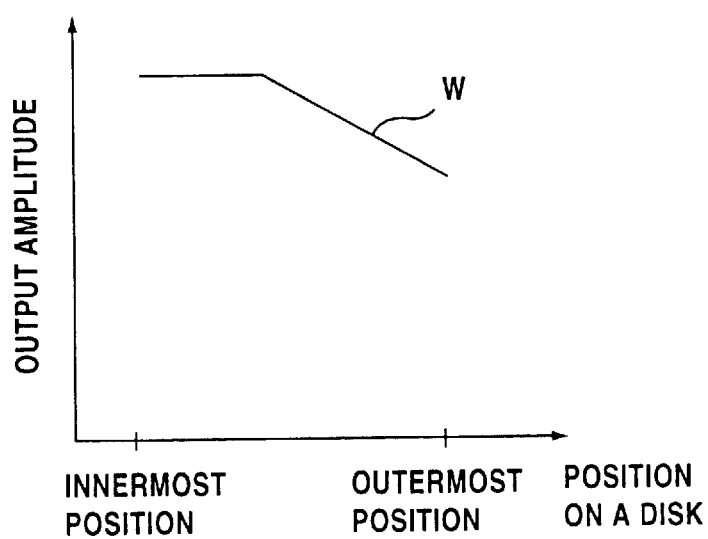
FIG. 8 is a graph showing the relationship between the output amplitude of the pickup apparatus when a disk having data recorded in the CLV system is rotated at a constant speed and the pickup position on the disk.
Figure 9:
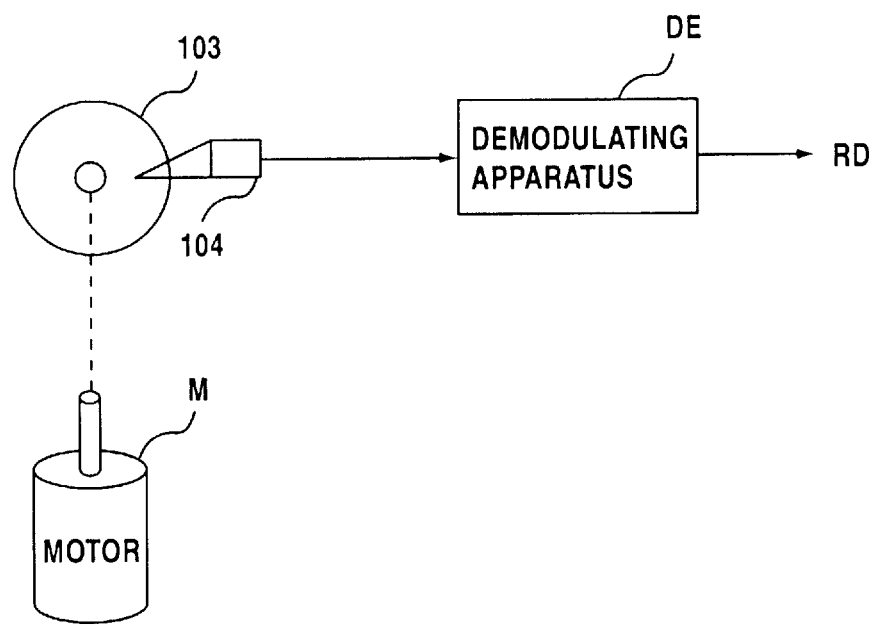
FIG. 9 is a general diagram of a data reading apparatus in accordance with this invention.

A data reading apparatus according to one embodiment of the present invention will now be described with reference to the accompanying drawings. FIG. 9 illustrates a general diagram of a data reading apparatus in accordance with the invention. By way of example, data may be recorded on at least a part of a recording medium 103 in the CLV system. When the recording medium 103 is rotated at a constant speed by means of a motor M, a pickup apparatus 104 supplies an output signal, associated with data recorded on the recording medium 103, to a demodulating apparatus DE. The demodulating apparatus DE receives the output signal from the pickup apparatus 104, and demodulates read data RD in association with a change in either the frequency or amplitude of that output signal.

Figure 10:
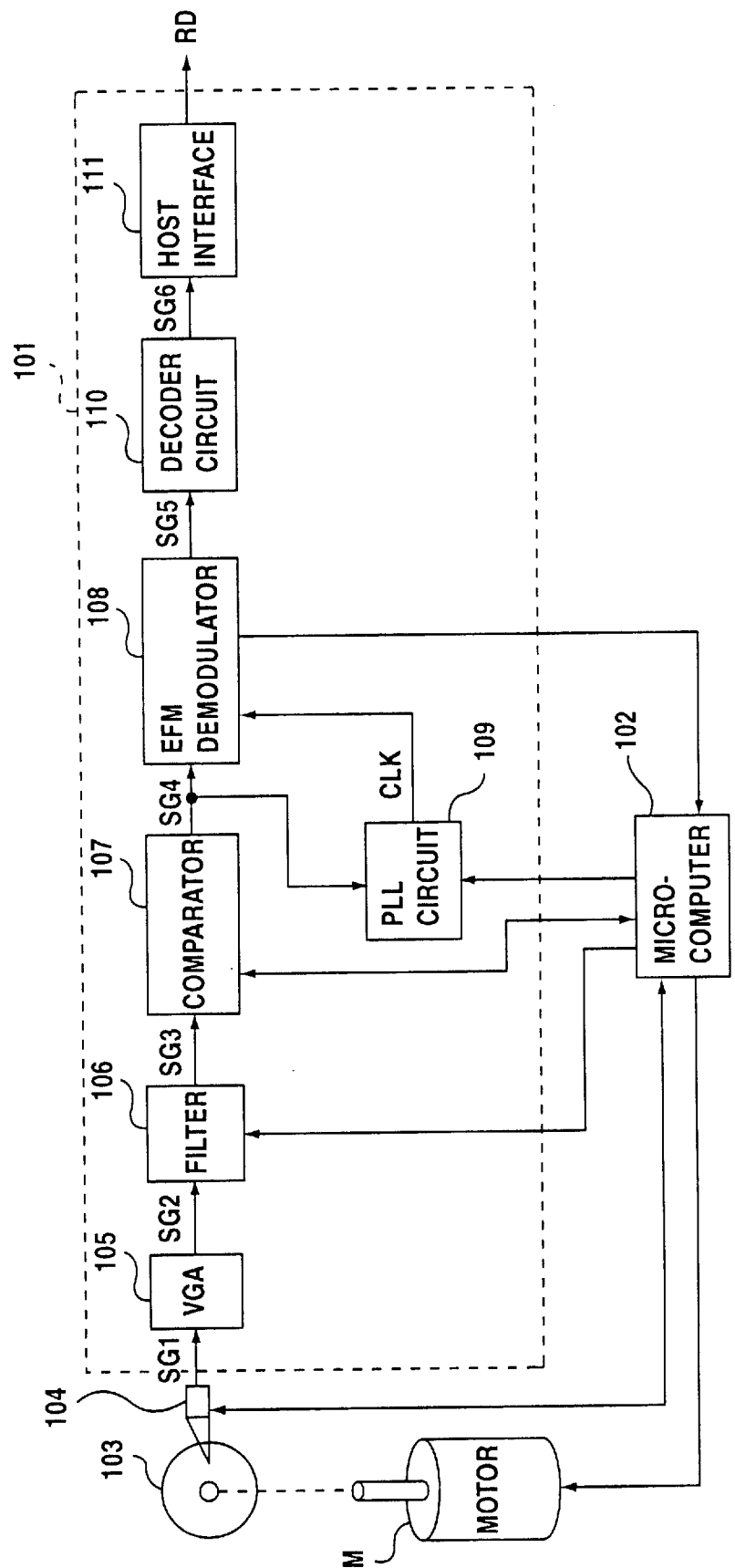
FIG. 10 is a block diagram of a data reading apparatus in accordance with one embodiment of this invention.

FIG. 10 shows a data reading apparatus in accordance with an embodiment of the invention. The data reading apparatus comprises a spindle motor M, a pickup 104 for reading data from a disk 103 (e.g., a CD-ROM, DVD or other recording medium) on which data is recorded using a CLV or ZCLV system, and a data demodulating apparatus 101. The motor M, pickup 104 and data demodulating apparatus 101 operate under the control of a microcomputer 102. The data demodulating apparatus 101 has a variable gain amplifier (VGA) 105, a filter 106, a comparator 107, an EFM (e.g., Eight-to-Fourteen Modulation) demodulator 108, a PLL circuit 109, a decoder circuit 110 and a host interface 111. Thus, the VGA 105, filter 106 and comparator 107 form a signal processor.

In this embodiment, disk 103 is rotated through a constant number of rotations by the spindle motor M in accordance with the CAV system, and data recorded on that disk 103 is optically read by the pickup 104. The pickup 104 supplies an analog signal SG1 associated with the read data to the VGA 105. Because data recorded on the disk 103 is read in accordance with the CAV system, the analog signal SG1 has a different frequency and amplitude each time the data reading position of the pickup 104 is shifted.

The VGA 105 amplifies the analog signal SG1 and supplies an amplified analog signal SG2, which typically has a constant amplitude, to the filter 106. The filter 106 extracts the frequency component necessary for later signal processing from the amplified analog signal SG2, and supplies a filtered analog signal SG3 to the comparator 107.

The comparator 107 receives the filtered analog signal SG3, compares the amplitude value of the filtered analog signal SG3 with a threshold value, and supplies a binarized digital pulse signal SG4 to the EFM demodulator 108 and the PLL circuit 109. In other words, the comparator 107 produces a digital pulse signal using the threshold value that varies in accordance with a change in the amplitude of the filtered analog signal. In this embodiment, the PLL circuit 109 produces a clock signal CLK according to the frequency of the digital pulse signal SG4, and supplies it to the EFM demodulator 108. The EFM demodulator 108 performs a known EFM demodulating process on the digital pulse signal in accordance with the clock signal CLK from the PLL circuit 109, and supplies a demodulated digital signal SG5 to the decoder circuit 110. The decoder circuit 110 decodes the demodulated digital signal SG5 to yield a decoded digital signal SG6. The host interface 111 receives the digital signal SG6 and outputs it as a read data signal RD.

VGA And Filter

Figure 11:
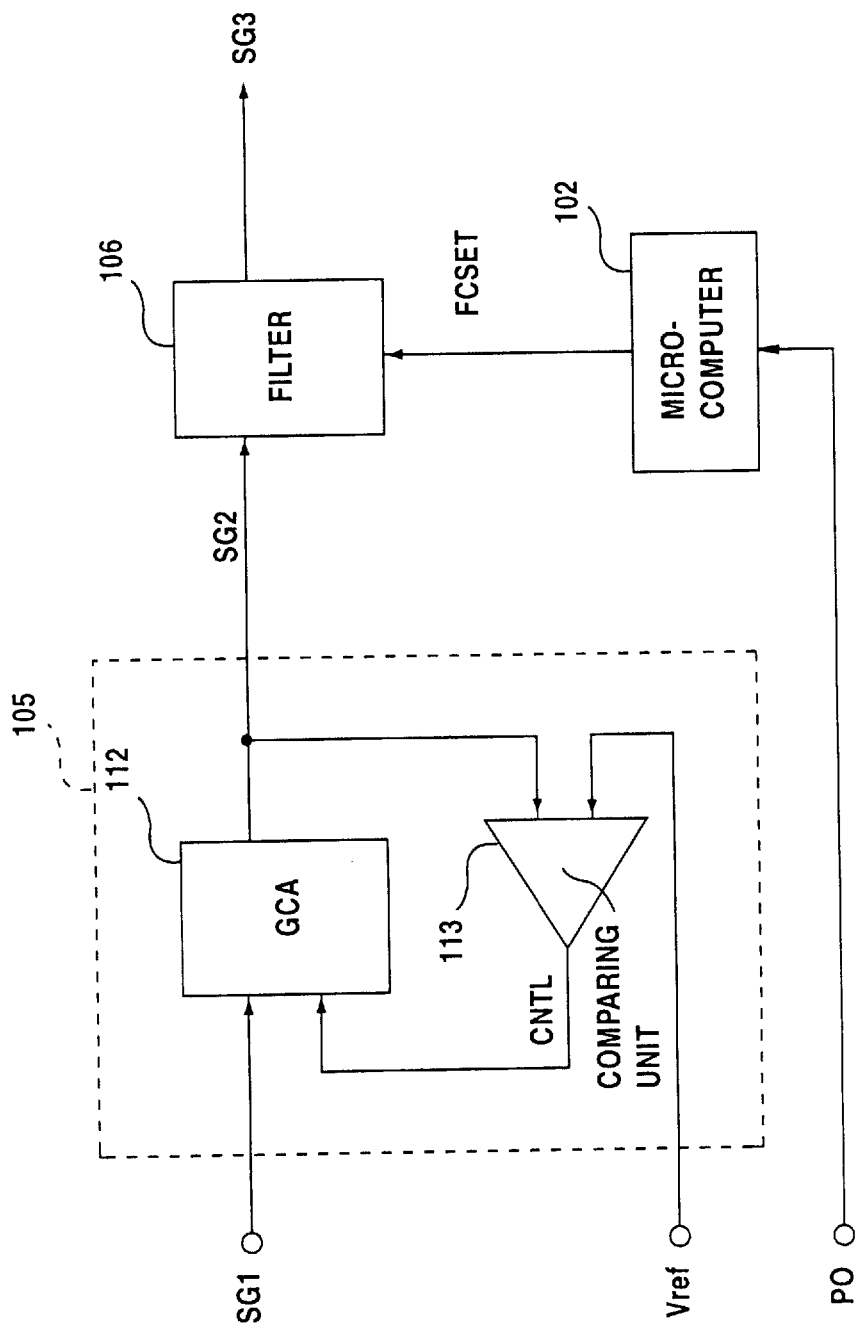
FIG. 11 is a block diagram showing a variable gain amplifier (VGA) implemented in the data reading apparatus in accordance with one embodiment.

As shown in FIG. 11, the VGA 105 has a gain control amplifier (GCA) 112 and a comparing unit 113. The GCA 112 amplifies the analog signal SG1 from the pickup 104 and outputs the amplified analog signal SG2. The comparing unit 113 receives the amplified analog signal SG2 and a reference voltage signal Vref. The comparing unit 113 compares the amplified analog signal SG2 with the reference voltage signal Vref and supplies a first control signal CNTL indicative of the comparison result of the GCA 112. The GCA 112 operates to produce the amplified analog signal SG2 having a given amplitude value by changing its own signal amplification factor in accordance with the first control signal CNTL.

The microcomputer 102 receives position information PO of the pickup 104 and sends a second control signal FCSET indicative of the position information PO to the filter 106. The filter 106 operates to control the cutoff frequency according to a change in the frequency of the amplified analog signal SG2 by altering a constant like its own capacitance in accordance with the second control signal FCSET. The filter 106 may be designed to have different cutoff frequencies from which the proper cutoff frequency is selected in accordance with the second control signal FCSET. Altering the cutoff frequency of the filter 106 in accordance with a change in the frequency of the amplified analog signal SG2 provides that the necessary frequency signal for later processing is extracted from the amplified analog signal SG2. Therefore, the data reading apparatus for reading data from the disk 103 where data has been recorded in accordance with the CLV or ZCLV system can easily employ the CAV system which rotates a disk at a substantially constant velocity.

Figure 12:
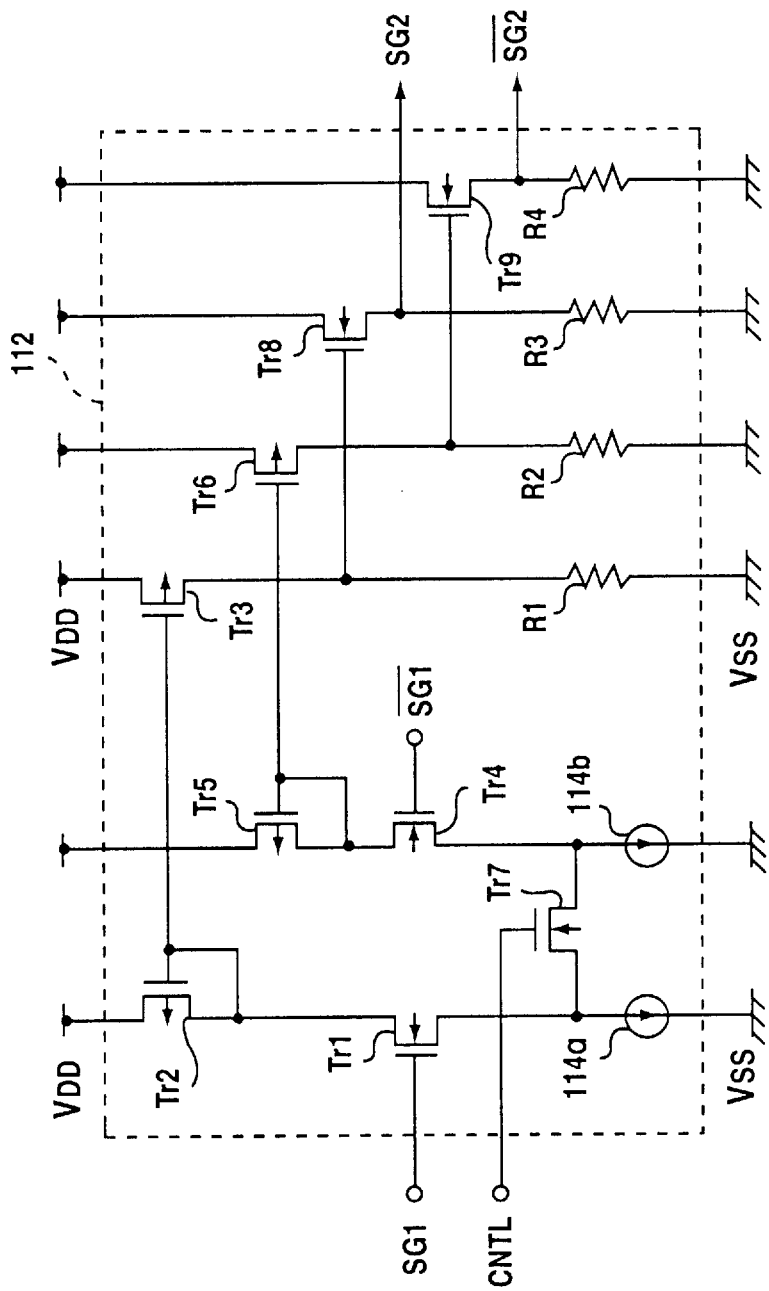
FIG. 12 is a circuit diagram showing a gain controlled amplifier (GCA) included in the VGA of FIG. 11.

FIG. 12 is a circuit diagram showing the GCA 112. An N channel MOS transistor Tr1 has a gate for receiving the input signal SG1, a drain connected via a P channel MOS transistor Tr2 to a high-potential power supply $V_{DD}$, and a source connected via a current source 114a to a low-potential power supply $V_{SS}$. The transistor Tr2 has a drain connected to the drain of the transistor Tr1 and a gate connected to its own drain and the gate of a P channel MOS transistor Tr3. The transistor Tr3 has a source connected to the power supply $V_{DD}$ and a drain connected via a resistor R1 to the power supply $V_{SS}$. The transistors Tr2 and Tr3 therefore form a current mirror circuit.

An N channel MOS transistor Tr4 has a gate for receiving an input signal /SG1, which is complementary to the input signal SG1, a drain connected via a P channel MOS transistor Tr5 to the power supply $V_{DD}$, and a source connected via a current source 114b to the power supply $V_{SS}$. The transistor Tr5 has a drain connected to the drain of the transistor Tr4 and a gate connected to its own drain and the gate of a P channel MOS transistor Tr6. The transistor Tr6 has a source connected to the power supply $V_{DD}$ and a drain connected via a resistor R2 to the power supply $V_{SS}$. The transistors Tr5 and Tr6 therefore form another current mirror circuit.

An N channel MOS transistor Tr7 is arranged to connect the sources of the transistors Tr1 and Tr4, and has a gate for receiving the first control signal CNTL. An N channel MOS transistor Tr8 has a gate connected to the drain of the transistor Tr3, a drain connected to the power supply $V_{DD}$, and a source connected via a resistor R3 to the power supply $V_{SS}$. An N channel MOS transistor Tr9 has a gate connected to the drain of the transistor Tr6, a drain connected to the power supply $V_{DD}$, and a source connected via a resistor R4 to the power supply $V_{SS}$. The transistors Tr8 and Tr9 respectively output complementary output signals SG2 and /SG2 from their sources.

In the GCA 112, there is a difference in the drain currents of both transistors Tr3 and Tr6 and a difference in the gate voltages of both transistors Tr8 and Tr9 in response to the level difference between the input signals (analog signals) SG1 and /SG1. In response to the difference between both gate voltages, there occurs a difference in the drain currents of the transistors Tr8 and Tr9. As a result, both transistors Tr8 and Tr9 amplify the input signals SG1 and /SG1 and output amplified complementary output signals (complementary analog signals) SG2 and /SG2, respectively, from their sources.

In this operation, when the voltage of the first control signal CNTL rises, the drain current of the transistor Tr7 increases. Consequently, the difference between the drain currents of the transistors Tr1 and Tr4 is reduced, resulting in a reduced potential difference between the complementary output signals SG2 and /SG2. The GCA 112 operates in this manner to decrease its own signal amplification factor to or below "1" in accordance with a rise in the voltage level of the first control signal CNTL. The GCA 112 also operates to increase its own signal amplification factor to or above "1" in accordance with a reduction in the voltage level of the first control signal CNTL.

Figure 13:
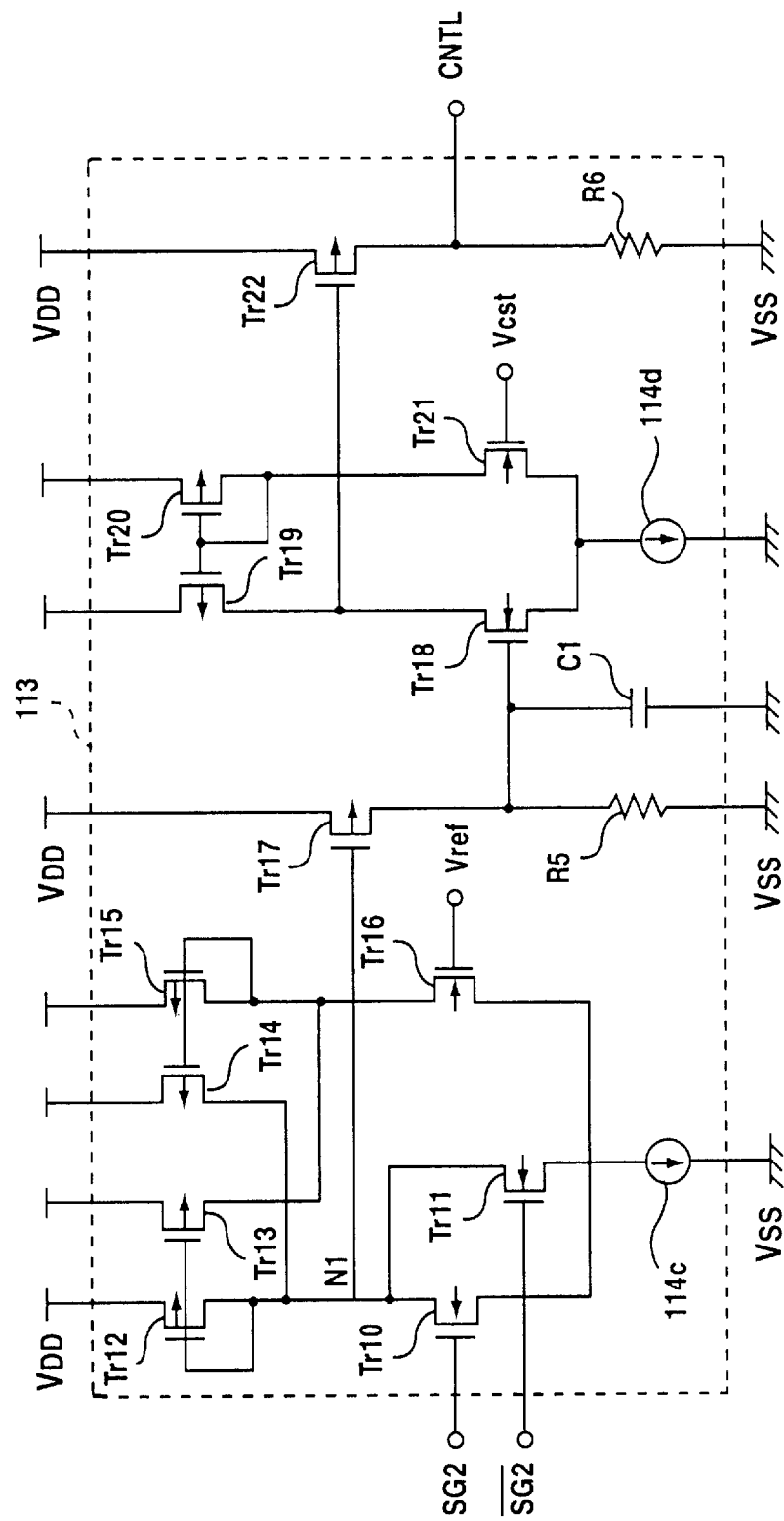
FIG. 13 is a circuit diagram showing a comparing unit included in the VGA of FIG. 11.

FIG. 13 is a circuit diagram showing the comparing unit 113. An N channel MOS transistor Tr10 has a gate for receiving the input signal (amplified analog signal) SG2, a source connected via a current source 114c to the power supply $V_{SS}$, and a drain connected via a P channel MOS transistor Tr12 to the power supply $V_{DD}$. An N channel MOS transistor Tr11 has a gate for receiving the input signal /SG2, a source connected via the current source 114c to the power supply $V_{SS}$, and a drain connected to the drain of the transistor Tr10. The transistor Tr12 has a source connected to the power supply $V_{DD}$, a drain connected to the drain of the transistor Tr10 and a gate connected to its own drain.

An N channel MOS transistor Tr16 has a gate for receiving the reference voltage Vref, a source connected via the current source 114c to the power supply $V_{SS}$, and a drain connected via a P channel MOS transistor Tr15 to the power supply $V_{DD}$. A P channel MOS transistor Tr13 has a gate connected to the drain of the transistor Tr12, a source connected to the power supply $V_{DD}$, and a drain connected to the drain of the transistor Tr16. The transistor Tr15 has a source connected to the power supply $V_{DD}$, a drain connected to the drains of the transistors Tr13 and Tr16 and a gate connected to its own drain. The transistor Tr14 has a gate connected to the drain of the transistor Tr15, a source connected to the power supply $V_{DD}$ and a drain connected to the drain of the transistor Tr10. Accordingly, the transistors Tr10 to Tr16 form a differential circuit, so that when the peak voltage values of the complementary input signals SG2 and /SG2 exceed the reference voltage Vref, the voltage at a node N1 (drain voltage) between the transistors Tr10 and Tr11 falls. When the peak voltage values of the input signals SG2 and /SG2 do not exceed the reference voltage Vref, on the other hand, the voltage at the node N1 rises.

A P channel MOS transistor Tr17 has a gate connected to the node N1, a source connected to the power supply $V_{DD}$ and a drain connected via a resistor R5 to the power supply $V_{SS}$. A capacitor C1 is connected in parallel to the resistor R5. An N channel MOS transistor Tr18 has a gate connected to the drain of the transistor Tr17, a source connected via a current source 114d to the power supply $V^{SS}$, and a drain connected via a P channel MOS transistor Tr19 to the power supply $V_{DD}$. The transistor Tr19 has a source connected to the power supply $V_{DD}$, a gate connected to the gate of a P channel MOS transistor Tr20, and a drain connected to the drain of the transistor Tr18. The transistor Tr20 has a source connected to the power supply $V_{DD}$ and a drain connected to its own gate. An N channel MOS transistor Tr21 has a drain connected to the drain of the transistor Tr20, a gate for receiving a fixed voltage Vcst, and a source connected via the current source 114d to the power supply $V_{SS}$. The fixed voltage Vcst is produced by a constant voltage generator (not shown). Accordingly, the transistors Tr18 to Tr21 form a differential circuit, so that when the gate voltage of the transistor Tr18 rises, the drain voltage of this transistor Tr18 falls while the drain voltage of the transistor Tr21 rises. When the gate voltage of the transistor Tr18 drops, the drain voltage of the transistor Tr18 rises while the drain voltage of the transistor Tr21 falls. A P channel MOS transistor Tr22 has a gate connected to the drains of the transistors Tr18 and Tr19, a source connected to the power supply $V_{DD}$ and a drain, from which the first control signal CNTL is output, connected to the power source via the register R6.

In the above-described comparing unit 113, when the amplitudes of the complementary input signals SG2 and /SG2 increase and the peak voltage values indicative of the amplitudes exceed the reference voltage Vref, the voltage at the node N1 falls, thus increasing the drain current of the transistor Tr17. Consequently, the gate voltage of the transistor Tr18 rises to increase the drain current of this transistor Tr18. As a result, the gate voltage of the transistor Tr22 falls, causing the drain current of this transistor Tr22 to increase. In this manner, the voltage level of the first control signal CNTL increases. When the amplitudes of the input signals SG2 and /SG2 decrease so that their peak voltage values do not exceed the reference voltage Vref, the voltage at the node N1 increases, causing the drain current of the transistor Tr17 to decrease. Consequently, the gate voltage of the transistor Tr18 falls to reduce the drain current of the transistor Tr18. As a result, the gate voltage of the transistor Tr22 rises to increase the drain current of the transistor Tr22. In this manner, the voltage level of the first control signal CNTL decreases. Note that the capacitor C1 is provided to prevent the gate voltage of the transistor Tr18 from drastically changing.

Figure 14A:
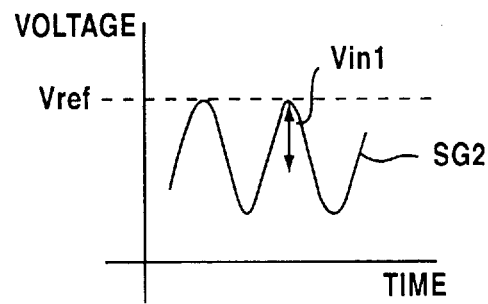
FIGS. 14A, 14B and 14C are diagrams showing the waveforms of output signals from the GCA.
Figure 15:
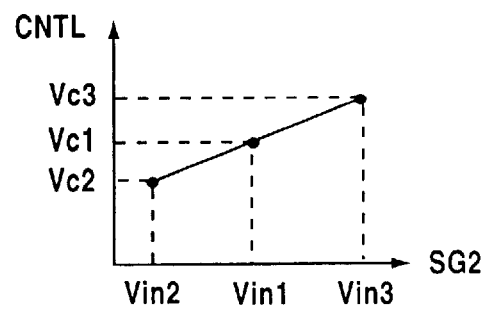
FIG. 15 is an input/output characteristic graph showing the relationship between the amplitude value of the output signal from the GCA and the voltage level of a first control signal output from the comparing unit.

The operation of the VGA 105, which has the GCA 112 and the comparing unit 113, will be now discussed. When the output signal SG2 having an amplitude value Vin1 is output from the GCA 112 and the peak of the amplitude value coincides with the reference voltage Vref as shown in FIG. 14A, the comparing unit 113 outputs the first control signal CNTL having a voltage level Vc1, as shown in FIG. 15. The constants of the individual transistors in the GCA 112 and the fixed voltage Vcst of the comparing unit 113 are set in such a way that the amplification factor of the GCA 112 becomes "1" in accordance with the voltage level Vc1.

Figure 14B:
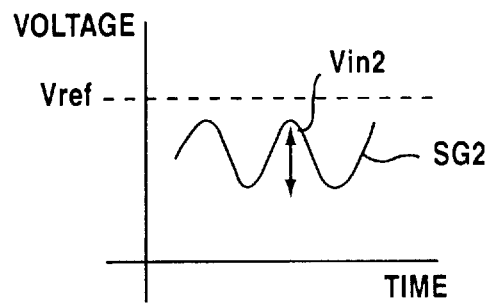

When the output signal SG2 having an amplitude value Vin2 is output from the GCA 112 and the peak of the amplitude value does not reach the reference voltage Vref as shown in FIG. 14B, the comparing unit 113 outputs the first control signal CNTL having a voltage level Vc2, which is lower than the voltage level Vc1, as shown in FIG. 15. In accordance with this voltage level Vc2, the GCA 112 sets its own amplification factor to or greater than "1" and outputs the output signal SG2 having an amplified amplitude value.

Figure 14C:
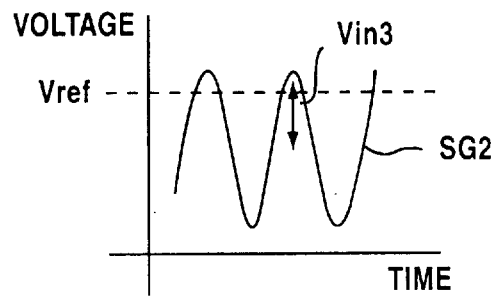

When the output signal SG2 having an amplitude value Vin3 is output from the GCA 112 and the peak of the amplitude value exceeds the reference voltage Vref as shown in FIG. 14C, the comparing unit 113 outputs the first control signal CNTL having a voltage level Vc3, higher than the voltage levels Vc1 and Vc2, as shown in FIG. 15. In accordance with this voltage level Vc3, the GCA 112 sets its own amplification factor to or smaller than "1" and outputs the output signal SG2 which has a reduced amplitude value. Through the above operation, even when the amplitude of the output signal SG1 of the pickup 104 changes, the VGA 105 can output the output signal SG2 whose amplitude value has a peak matching with the reference voltage Vref. When the frequency of the output signal SG2 of the VGA 105 changes, the filter 106 adjusts the cutoff frequency in accordance with the second control signal FCSET from the microcomputer 102. Accordingly, the unnecessary frequency component in the output signal (amplified analog signal) SG2 can be surely removed. This eliminates the difficulty in the demodulating process caused by changes in the amplitude and frequency of the analog signal SG1 from the pickup 104 at the time data is read from the disk 103, which has data recorded in the CLV or ZCLV system, in accordance with the CAV system. This feature advantageously facilitates the employment of the CAV system.

Figure 16:
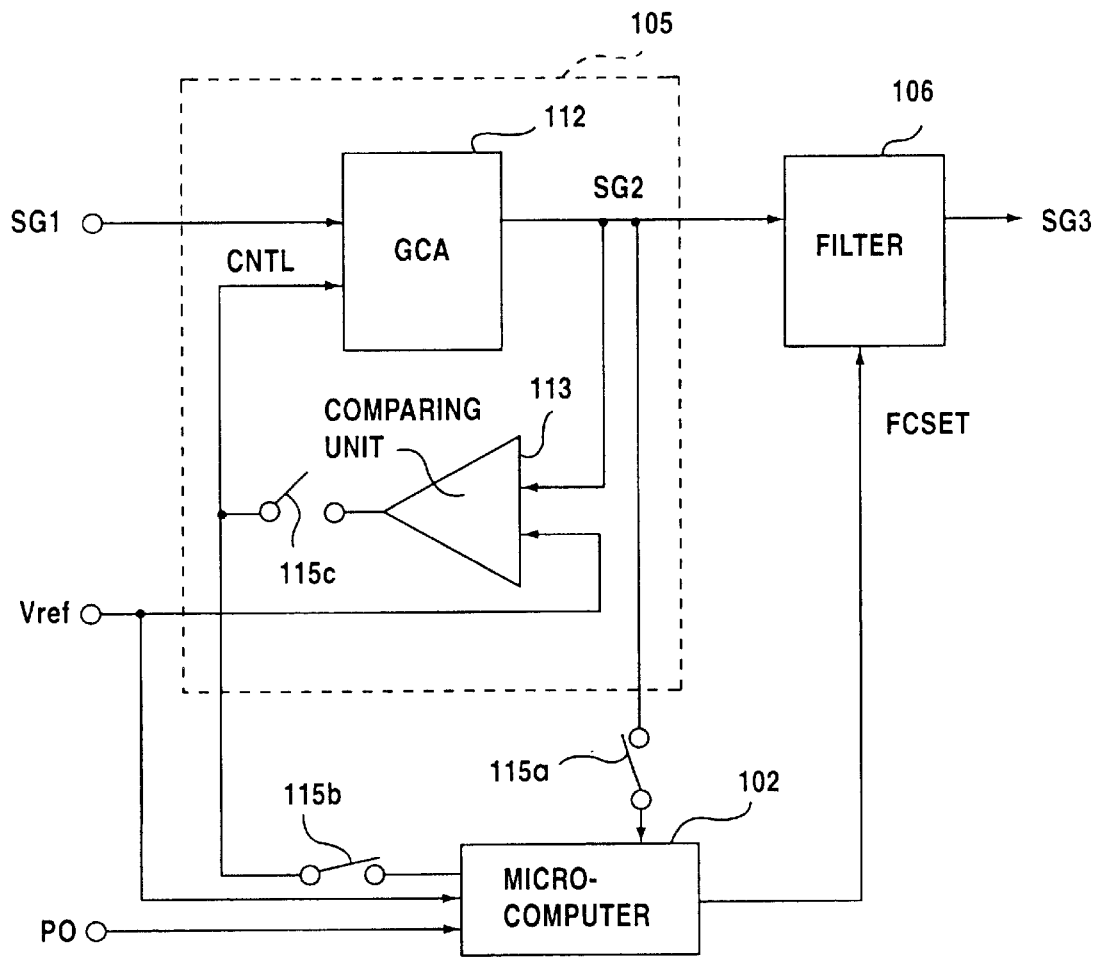
FIG. 16 is a block diagram showing another example of the VGA.

FIG. 16 shows another example of the VGA 105, in which the microcomputer 102 as well as the comparing unit 113 produce the first control signal CNTL to be supplied to the GCA 112. The microcomputer 102 receives the output signal SG2 from the GCA 112 via a switch 115a, and also receives the reference voltage Vref. The microcomputer 102 functions to perform an arithmetic operation on the first control signal CNTL based on the output signal SG2 and the reference voltage Vref in such a way that the peak amplitude value of the output signal SG2 coincides with the reference voltage Vref. The GCA 112 receives the first control signal CNTL from the microcomputer 102 via a switch 115b as well as the first control signal CNTL from the comparing unit 113 via the switch 115c.

When the switches 115a and 115b are closed and a switch 115c is opened, the GCA 112 outputs the output signal SG2 having a given amplitude in accordance with the first control signal CNTL from the microcomputer 102. When the switches 115a and 115b are opened and the switch 115c is closed, the GCA 112 outputs the output signal SG2 having a given amplitude in accordance with the first control signal CNTL from the comparing unit 113 as in the example illustrated in FIG. 11.

Comparator (First Example)

Figure 17:
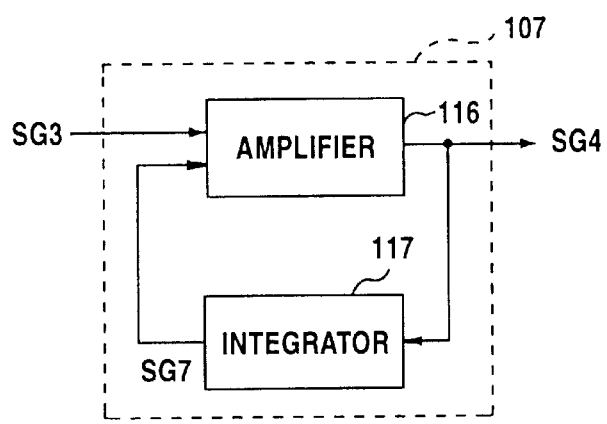
FIG. 17 is a block diagram showing a comparator included in the data reading apparatus in accordance with one embodiment of the invention.

As shown in FIG. 17, the comparator 107 in the first example has an amplifier 116, which receives the filtered analog signal SG3 from the filter 106, and an integrator 117. The integrator 117 is a known circuit which has an operational amplifier, a resistor and a capacitor, the latter two connected in parallel between the input and output terminals of the operational amplifier. The integrator 117 receives the digital pulse signal SG4 from the amplifier 116, and supplies an output signal SG7 to the amplifier 116. The amplifier 116 shapes the waveform of the analog input signal SG3 to yield the digital pulse signal SG4 by using the voltage level of the output signal SG7 from the integrator 117 as a threshold value.

Figure 18:
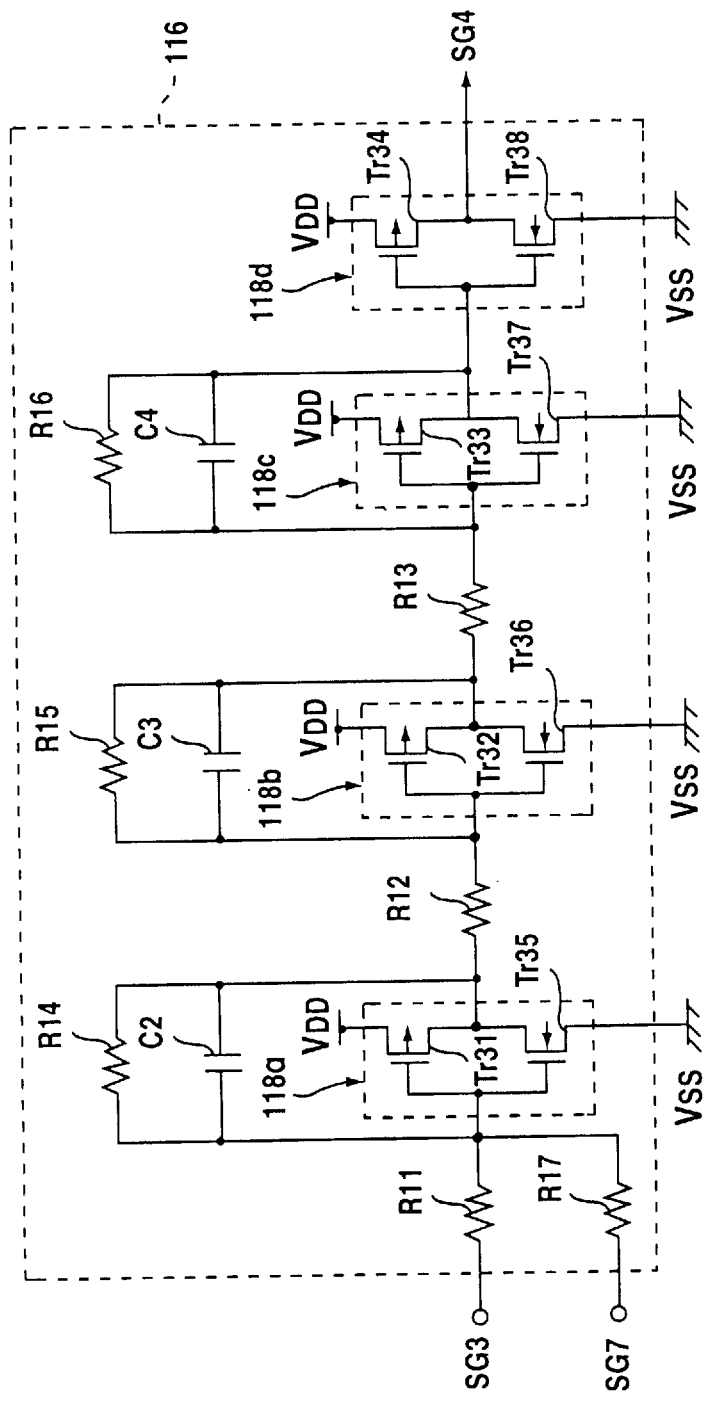
FIG. 18 is a circuit diagram showing an amplifier that is included in the comparator of FIG. 17.

As shown in FIG. 18, the amplifier 116 has four stages of inverters 118a to 118d connected in series. The first-stage inverter 118a receives the input signal SG3 via a resistor R11. A resistor R12 is intervened between the first-stage inverter 118a and second-stage inverter 118b, and a resistor R13 is intervened between the second-stage inverter 118b and third-stage inverter 118c. A resistor R14 and a capacitor C2 are connected in parallel between the input and output terminals of the inverter 118a. The capacitance of the capacitor C2 is set to about 0.33 pF, and the resistances of the resistors R14 and R11 are set to about 20 kΩ, for example. Thus, the inverter 118a constitutes an amplifier with an amplification factor of "1". A resistor R15 and a capacitor C3 are connected in parallel between the input and output terminals of the inverter 118b. The capacitance of the capacitor C3 is set to about 0.18 pF, and the resistances of the resistors R12 and R15 are respectively set to about 5 kΩ and about 25 kΩ, for example. Thus, the inverter 118b constitutes an amplifier with an amplification factor of about "5". A resistor R16 and a capacitor C4 are connected in parallel between the input and output terminals of the inverter 118c. The capacitance of the capacitor C4 is set to about 0.11 pF, and the resistances of the resistors R13 and R16 are respectively set to about 5 kΩ and about 30 kΩ, for example. Thus, the inverter 118c constitutes an amplifier with an amplification factor of about "6".

The inverter 118a receives the output signal SG7 from the integrator 117 via a resistor R17. The inverters 118a to 118d have different cutoff frequencies so that the rising and falling speeds of their output signals become the same. For the individual inverters 118a–118d to have different cutoff frequencies, the gate widths W and the gate lengths L of P channel MOS transistors Tr31 to Tr34 and N channel MOS transistors Tr35 to Tr38, which constitute the inverters 118a–118d, are set as follows. The units for W and L are all microns.

|       |              |              |
| ----- | ------------ | ------------ |
| Tr 31 | W = about 37  | L = about 0.5 |
| Tr 32 | W = about 57  | L = about 0.6 |
| Tr 33 | W = about 73  | L = about 0.7 |
| Tr 34 | W = about 103 | L = about 0.8 |
| Tr 35 | W = about 12  | L = about 0.7 |
| Tr 36 | W = about 15  | L = about 0.8 |
| Tr 37 | W = about 18  | L = about 1.0 |
| Tr 38 | W = about 24  | L = about 1.2 |

With the above setting, the inverter 118a has a cutoff frequency of about 24 MHz, the inverter 118b has a cutoff frequency of about 35 MHz, and the inverter 118c has a cutoff frequency of about 48 MHz.

Figure 19:
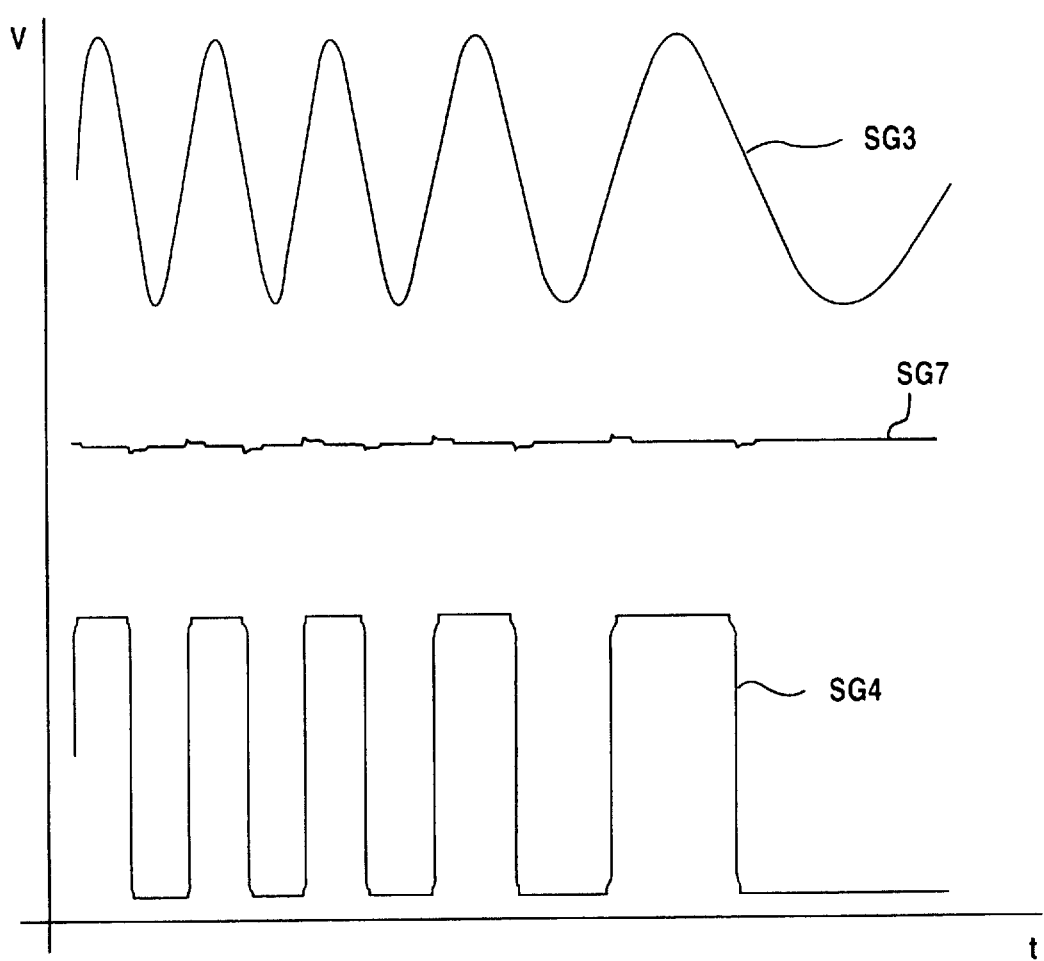
FIG. 19 is a diagram showing the waveforms of an analog signal from a filter that is included in the data reading apparatus of one embodiment of the invention, a digital pulse signal from the comparator, and an output signal from an integrator of the comparator.

As shown in FIG. 19, the inverters 118a–118d in the amplifier 116 sequentially amplify the filtered analog signal SG3. Any inverter at a subsequent stage produces a filtered analog signal having a greater amplitude than the inverter at the preceding stage, and the amplitude gradually becomes saturated. Accordingly, the last-stage inverter 118d outputs the digital pulse signal SG4. At this time, the amplitude of the filtered analog signal SG3 transiently changes in accordance with a change in frequency, regardless of the operation of the VGA 105. This amplitude becomes smaller as the frequency increases, and becomes greater as the frequency decreases. When the recording system for the disk 103 is the CLV system, the frequency and amplitude of the filtered analog signal SG3 vary as the position of the pickup 104 shifts. In the case of ZCLV system, the frequency and amplitude of the filtered analog signal SG3 vary in accordance with the movement of the position of the pickup 104 in each zone.

The first-stage inverter 118a, whose input and output terminals are connected via the resistor R14 and the capacitor C2, operates to converge the bias voltage to $V_{DD}/2$. When the amplitude of the filtered analog signal SG3 changes and the intermediate level of the signal SG3 is shifted from $V_{DD}/2$, the duty of the digital pulse signal SG4 is deviated from 1:1. However, the first-stage inverter 118a operates in response to the output signal SG7 from the integrator 117 such that the bias voltage follows the intermediate level of the filtered analog signal SG3. More specifically, when the intermediate level of the filtered analog signal SG3 becomes lower than $V_{DD}/2$, the digital pulse signal SG4 having pulse widths of a short H level and a long L level is output. As a result, the integrator 117 outputs the output signal SG7 with a reduced voltage level, and the first-stage inverter 118a performs a correction operation in response to this level-reduced digital pulse signal so as to reduce the bias voltage. When the intermediate level of the filtered analog signal SG3 becomes higher than $V_{DD}/2$, the digital pulse signal SG4 having pulse widths of a short L level and a long H level is output. As a result, the integrator 117 outputs the output signal SG7 with an increased voltage level, and the first-stage inverter 118a performs a correction operation in response to this level-increased digital pulse signal so as to increase the bias voltage. The amplifier 116 and the integrator 117 operate in such a fashion that the duty of the digital pulse signal SG4 becomes 1:1. Therefore, the comparator 107 having the amplifier 116 and integrator 117 of the embodiment according to the invention can convert the filtered analog signal SG3 to a digital pulse signal having a constant duty, regardless of a change in the frequency of the filtered analog signal SG3. This feature facilitates the employment of the CAV system.

Comparator (Second Example)

Figure 20:
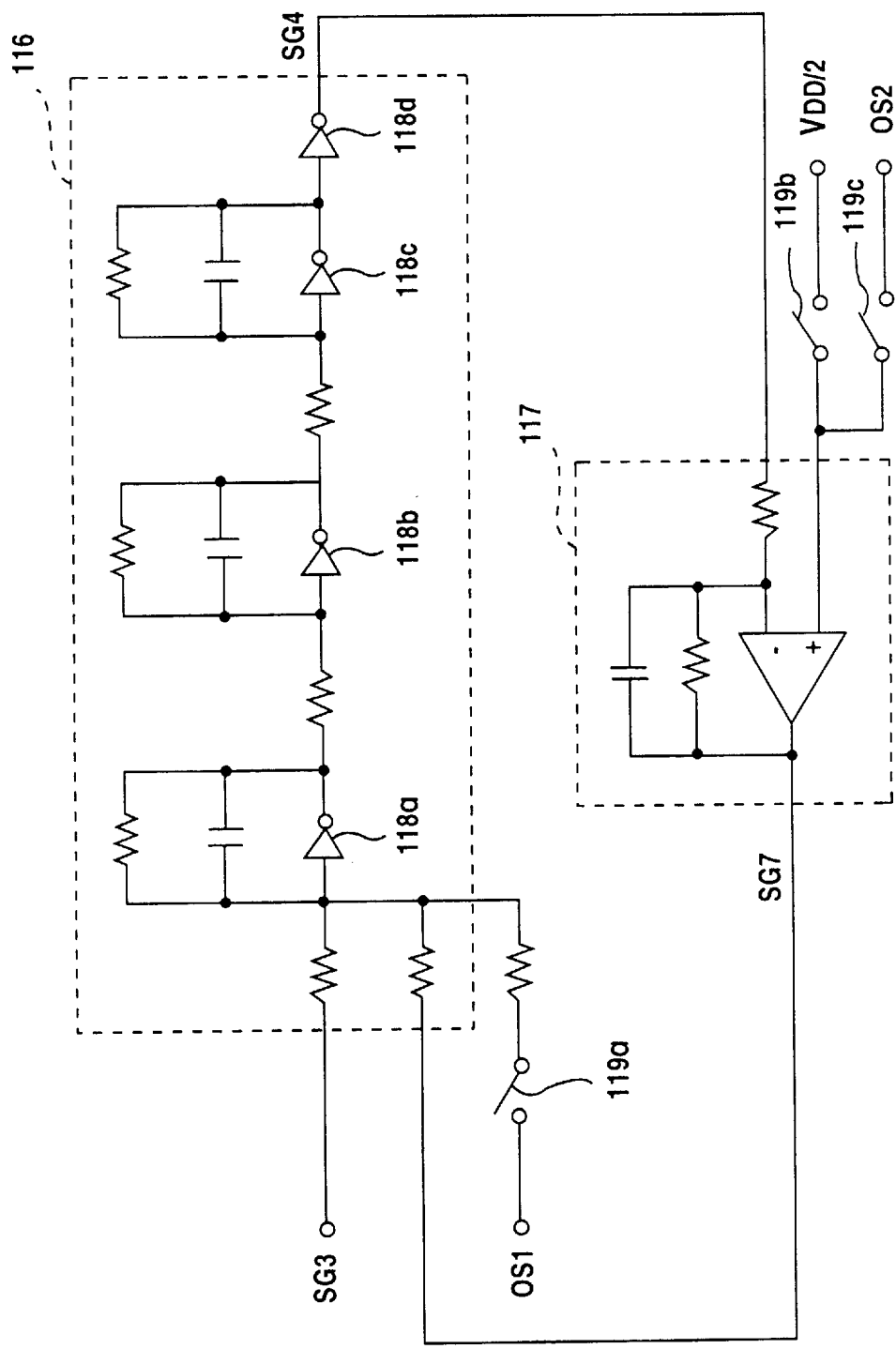
FIG. 20 is a circuit diagram showing a second example of a comparator in accordance with an embodiment of the invention.

As shown in FIG. 20, the amplifier 116 in the second example receives an offset voltage OS1 from the microcomputer 102 via a switch 119a. The amplifier 116 operates in such a way that the deviation of the duty of the digital pulse signal SG4 is corrected in response to the offset voltage OS1. The integrator 117 receives $V_{DD}/2$ as the bias voltage via a switch 119b, and receives an offset voltage OS2 from the microcomputer 102 via a switch 119c. The integrator 117 operates in such a way that the deviation of the duty of the digital pulse signal SG4 is corrected in accordance with the offset voltage OS2.

In the second example, the microcomputer 102 computes the value of the bias voltage to be offset in the first-stage inverter 118a in accordance with the signal which is sent to the microcomputer 102 from the EFM demodulator 108, and converts the computed offset value to an analog voltage (offset voltage OS1) using a D/A converter (not shown). The microcomputer 102 also computes the value of the bias voltage to be offset in the integrator 117, and converts the computed offset value to an analog voltage (offset voltage OS2) using the D/A converter. The microcomputer 102 controls the ON/OFF actions of the switches 119a–119c.

When the switch 119b is closed (or set on) and the switches 119a and 119c are opened (or set off) in the second example, the comparator 107 operates in the same manner as in the first example. When the bias voltage of the amplifier 116 is shifted from $V_{DD}/2$, the microcomputer 102 sets the switch 119b off and sets the switch 119c on to supply the computed offset voltage OS2 to the integrator 117. In response to the offset voltage OS2, the integrator 117 adjusts its own bias voltage so that the offset voltages of the integrator 117 and the amplifier 116 coincide with each other. This adjustment causes the duty of the digital pulse signal SG4 to be corrected in an accurate and rapid manner. When the bias voltage of the integrator 117 is shifted from $V_{DD}/2$, the microcomputer 102 sets the switch 119a on to supply the computed offset voltage OS1 to the amplifier 116.

In response to the offset voltage OS1, the amplifier 116 operates to correct the duty of the digital pulse signal SG4.

Comparator (Third Example)

Figure 21:
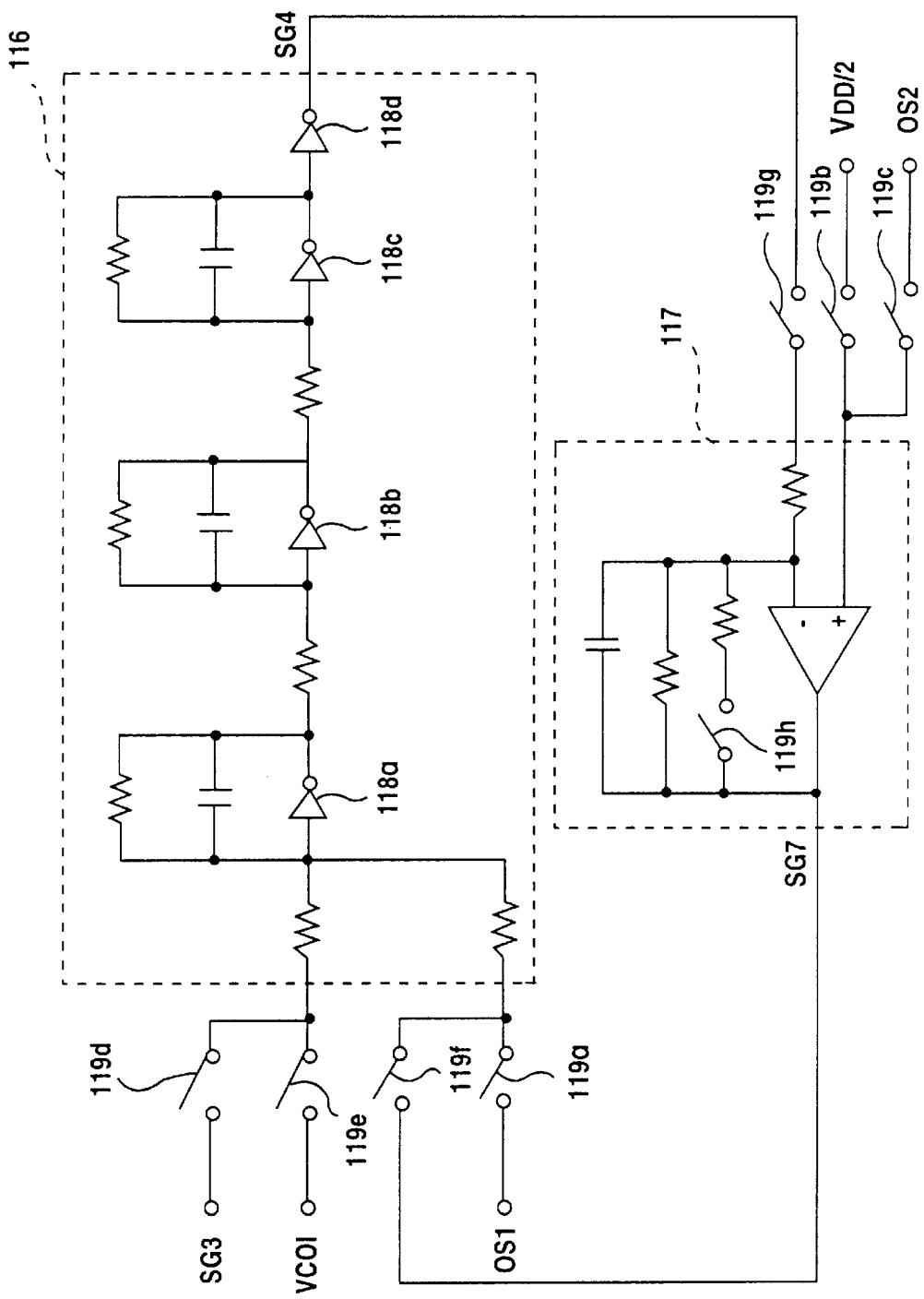
FIG. 21 is a circuit diagram showing a third example of a comparator in accordance with an embodiment of the invention.

As shown in FIG. 21, the comparator 107 in the third example further has a control function involving four additional switches 119d–119h. The amplifier 116 receives the filtered digital signal SG3 via the switch 119d, or receives an arbitrary pulse signal VCOI via the switch 119e. The amplifier 116 also receives the output signal SG7 from the integrator 117 via the switch 119f. The integrator 117 receives the digital pulse signal SG4 from the amplifier 116 via the switch 119g. A resistor is connected via the switch 119h between the input and output terminals of the operational amplifier of the integrator 117. The microcomputer 102 produces the pulse signal VCOI and controls the switching of the switches 119a–119h. With the switches 119d, 119f and 119g set on and the switch 119h set off in the comparator of the third example, the same advantages as obtained by the second example can be attained by controlling the open/close states of the remaining switches.

The comparator 107 of the third example can shorten the time needed for the normal digital pulse signal SG4 to be obtained when the supply of the filtered analog signal SG3 is restarted. When data recorded on the disk 103 is not read by the pickup 104, or when data cannot be read due to a defect on the disk, the filtered analog signal SG3 is fixed to the H level or L level. At this time, the microcomputer 102 sets off the switches 119d, 119f and 119g and sets on the switches 119e and 119h to disconnect the integrator 117 from the amplifier 116. This switch control allows the integrator 117 to output the output signal SG7 fixed to $V_{DD}/2$, and the amplifier 116 performs an amplifying operation according to the pulse signal VCOI and outputs a predetermined digital pulse signal.

When the supply of the filtered analog signal SG3 is restarted in the proper reading operation while this standby state is maintained, the microcomputer 102 executes switch control so that the amplifier 116 and the integrator 117 can perform the above-described normal operation (operation according to the second example). At this time, the output signal SG7 fixed to $V_{DD}/2$ and the predetermined digital pulse signal are spontaneously restored to the normal signal states. The time needed for the normal digital pulse signal SG4 to be obtained becomes shorter than the time for the digital pulse signal SG4 and the output signal SG7 to be restored to the normal signal states from the fixed H level or L level state.

In the standby mode, instead of causing the integrator 117 to output the output signal SG7 fixed to $V_{DD}/2$ under the switch condition, the switch 119c may be set on to supply the offset voltage OS2 of the integrator 117 which matches with the offset voltage OS1 of the amplifier 116. This switch control can further shorten the time for the digital pulse signal SG4 to be restored.

PLL Circuit

Figure 22:
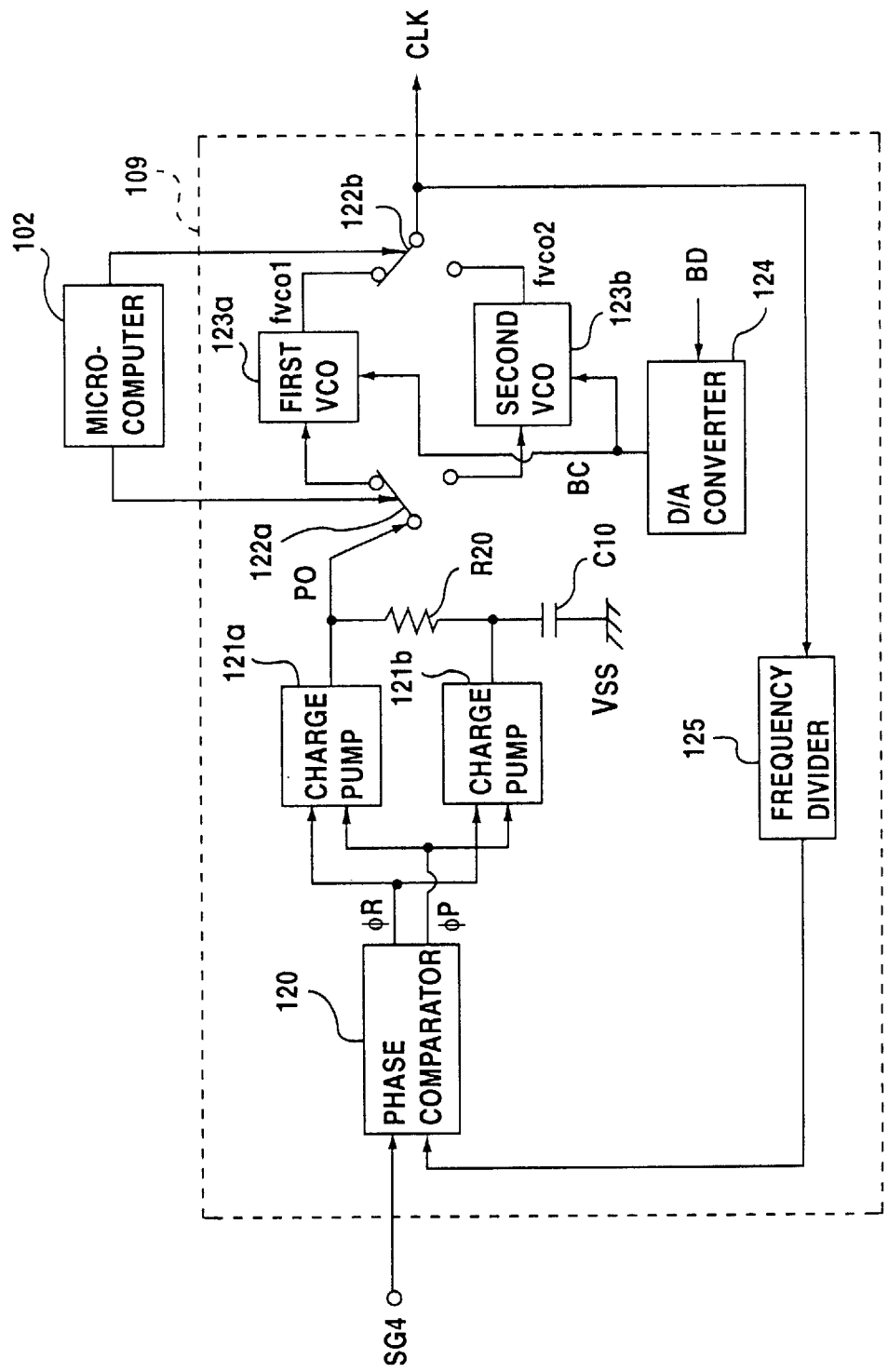
FIG. 22 is a block diagram showing a PLL circuit included in a data reading apparatus in accordance with an embodiment of the invention.

As shown in FIG. 22, the PLL circuit 109 includes a phase comparator 120, charge pumps 121a and 121b, first and second VCOs 123a and 123b, a D/A converter 124 and a frequency-divider 125. In this embodiment, the PLL circuit can suppress a variation in the gain of a VCO over a wide frequency range.

In general, as the output frequency $f_{VCO}$, increases, the gain of a VCO becomes greater. In this data reading apparatus 101, therefore, a large variation in the frequency of the digital pulse signal SG4 caused by the shifting of the position of the pickup 104 results in a significant change in the gain of each VCO in the PLL circuit 109. The VCO having a high gain cannot maintain the output frequency $f_{VCO}$ stable after being locked up, while the VCO having a low gain locks up the output frequency $f_{VCO}$ over a long period of time. The PLL circuit according to the invention advantageously suppresses a gain change caused by a change in the output frequency $f_{VCO}$ of the VCO over a wide frequency range.

The phase comparator 120 receives the digital pulse signal SG4 from the comparator 107 and a frequency-divided clock signal from the frequency-divider 125. The phase comparator 120 outputs phase difference signals øR and øP each indicative of the phase difference between the digital pulse signal SG4 and the frequency-divided clock signal. The charge pumps 121a and 121b respectively receive the phase difference signals øR and øP in parallel, and output current signals according to the phase difference signals øR and øP. The charge pump 121a has an output terminal connected to the power supply $V_{SS}$ via a resistor R20 and a capacitor C10. The charge pump 121b has an output terminal connected to the node between the resistor R20 and the capacitor C10. The resistor R20 and the capacitor C10 serve to smooth the current signals from the charge pumps 121a and 121b which operate in parallel.

The output signal PO from the charge pump 121a or 121b is selectively supplied to the first VCO 123a or the second VCO 123b via a switch 122a which is controlled by the microcomputer 102. The first VCO 123a and the second VCO 123b further receive the bias current BC from the D/A converter 124. The first VCO 123a and the second VCO 123b have different gains, and the first VCO 123a has a gain higher than that of the second VCO 123b.

The microcomputer 102 controls the switch 122a in accordance with the position information of the pickup 104. More specifically, the switch 122a is switched so that when the pickup 104 is located on the inner periphery side of the disk 103, the first VCO 123a is selected, whereas when the pickup 104 is located on the outer periphery side of the disk 103, the second VCO 123b is selected. In accordance with the position information of the pickup 104, the microcomputer 102 produces a bias control signal BD to be supplied to the D/A converter 124.

Upon reception of the bias control signal BD from the microcomputer 102, the D/A converter 124 produces the bias current signal BC having been converted to an analog value, and supplies this bias current signal BC to the first and second VCOs 123a and 123b. The bias current signal BC becomes greater when the pickup 104 moves toward the outer periphery (e.g., when the digital pulse signal SG4 having a high frequency is output from the comparator 107). On the other hand, the bias current signal BC becomes smaller when the pickup 104 moves toward the inner periphery (e.g., when the digital pulse signal SG4 having a low frequency is output from the comparator 107).

Either an oscillation output signal $f_{VCO1}$ from the first VCO 123a or an oscillation output signal $f_{VCO2}$ from the second VCO 123b is output as a clock signal CLK via a switch 122b which is controlled by the microcomputer 102. In other words, the microcomputer 102 controls the switch 122b in such a manner that the oscillation output signal from the VCO which has received the output signal PO from the charge pump 121a or 121b is output as the clock signal CLK.

Figure 23:
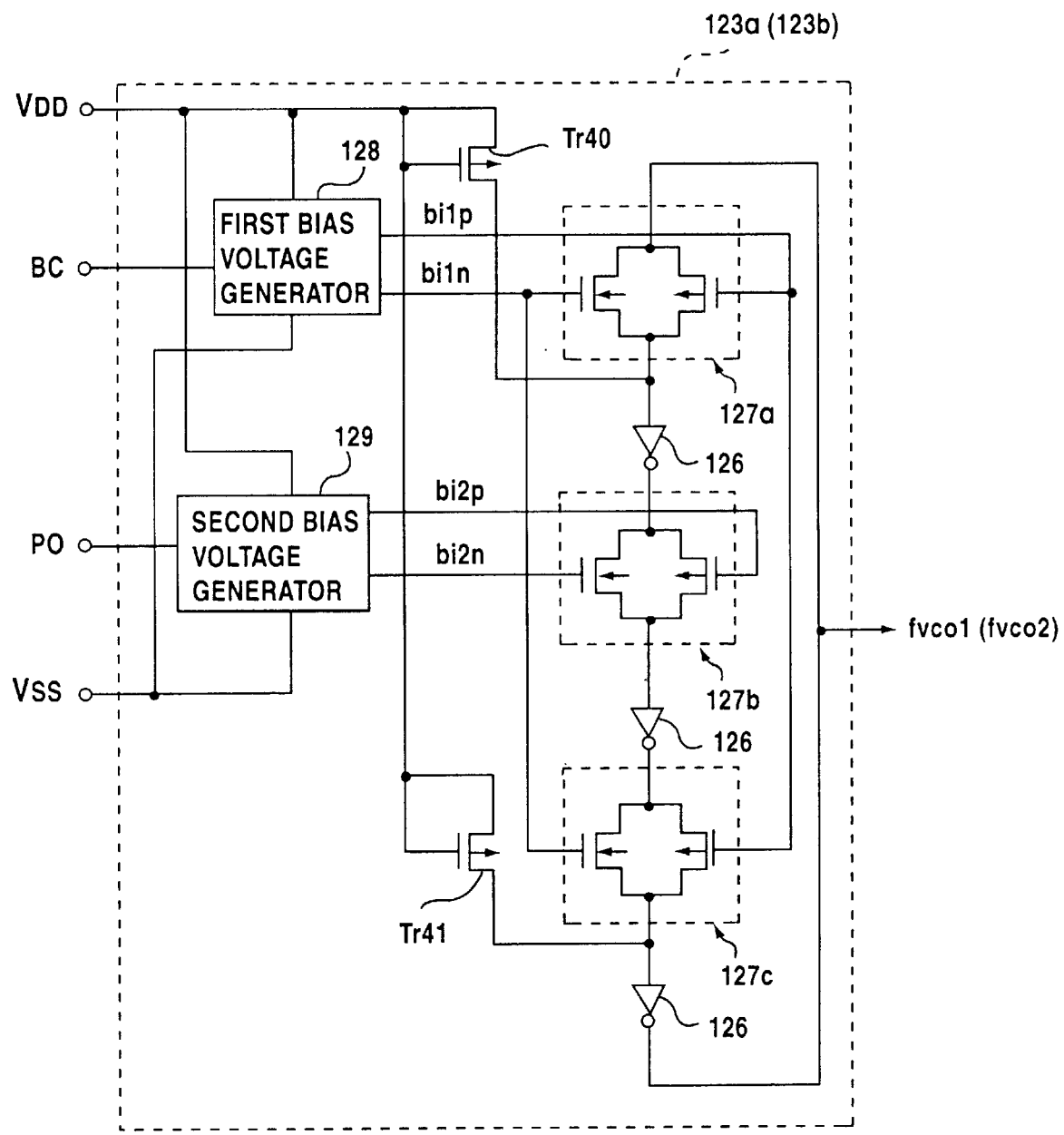
FIG. 23 is a circuit diagram showing a voltage controlled oscillator (VCO) included in the PLL circuit of FIG. 22.

As shown in FIG. 23, the first VCO 123a and the second VCO 123b have different gains, however, they have substantially the same structure. Accordingly, a description will be given only for the first VCO 123a. The first VCO 123a includes first and second bias generators 128 and 129, three stages of inverters 126, transfer gates 127a to 127c, and P channel MOS transistors Tr40 and Tr41.

The three inverters 126 are respectively located between adjoining two of the three transfer gates 127a–127c, and form a loop connection together with the transfer gates 127a–127c. One of the inverters 126 has an output terminal from which the oscillation output signal $f_{VCO1}$ is output.

Each of the transfer gates 127a and 127c include a P channel MOS transistor and an N channel MOS transistor. Each P channel MOS transistor has a gate for receiving a control signal bi1p output from the first bias voltage generator 128, and each N channel MOS transistor has a gate for receiving a control signal bi1n which is also output from the first bias voltage generator 128. The currents flowing through the transfer gates 127a and 127c are controlled by both control signals bi1p and bi1n. When the currents flowing through the transfer gates 127a and 127c increase, therefore, the oscillation output signal $f_{VOC1}$ having a high frequency is output.

The transfer gate 127b includes a P channel MOS transistor and an N channel MOS transistor. The P channel MOS transistor has a gate for receiving a control signal bi2p output from the second bias voltage generator 129, and the N channel MOS transistor has a gate for receiving a control signal bi2n also output from the second bias voltage generator 129. The current flowing through the transfer gate 127b is controlled by both control signals bi2p and bi2n. When the current flowing through the transfer gate 127b increases, therefore, the oscillation output signal $f_{VCO1}$ having a high frequency is output.

The P channel MOS transistor Tr40 has a source connected to the output terminal of the transfer gate 127a, and a drain and gate both connected to the power supply $V_{DD}$. The P channel MOS transistor Tr41 has a source connected to the output terminal of the transfer gate 127c, and a drain and gate both connected to the power supply $V_{DD}$. When the transfer gates 127a and 127c send out output signals whose voltages are higher than the supply voltage $V_{DD}$ by the threshold values of the transistors Tr40 and Tr41 or greater values, the P channel MOS transistors Tr40 and Tr41 are turned on. Therefore, the transistors Tr40 and Tr41 serve to absorb noise which is generated by the control of the currents flowing through the transfer gates 127a and 127c.

The first bias voltage generator 128 receives the bias current BC from the D/A converter 124. The second bias voltage generator 129 receives the output signal (e.g., smoothed current signal) PO from one of the charge pumps 121a and 121b.

Figure 24:
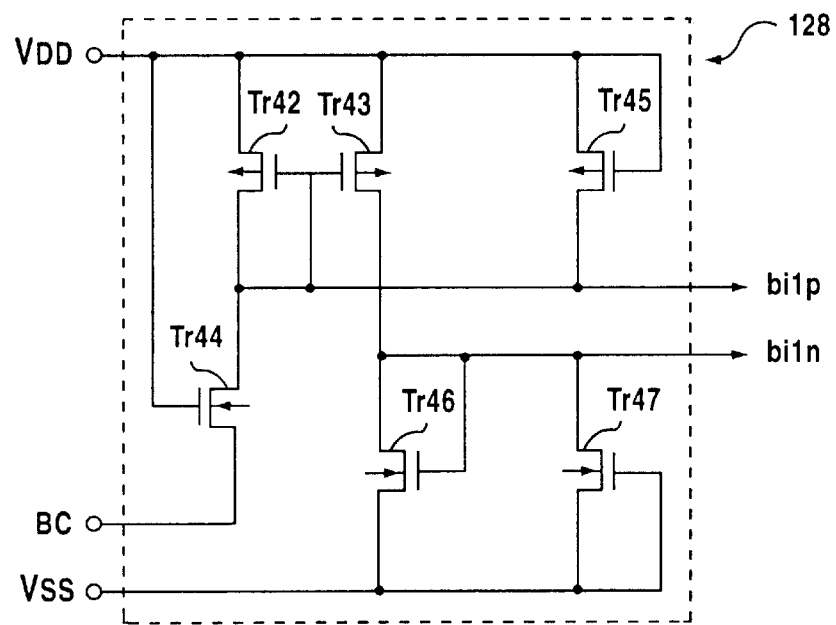
FIG. 24 is a circuit diagram showing a first bias voltage generator included in the PLL circuit of FIG. 22.

FIG. 24 is a circuit diagram showing the first bias voltage generator 128. Because the second bias voltage generator 129 operates in the same way as the first bias voltage generator 128, the description of its structure will not be repeated.

In the first bias voltage generator 128, a P channel MOS transistor Tr42 has a source connected to the power supply $V_{DD}$, a drain which receives the bias current BC via an N channel MOS transistor Tr44, and a gate connected to the gate of a P channel MOS transistor Tr43 and its own drain. The transistor Tr43 has a source connected to the power supply $V_{DD}$, a gate connected to the gate of the transistor Tr42, and a drain connected via an N channel MOS transistor Tr46 to the power supply $V_{SS}$. The transistor Tr44 has a gate connected to the power supply $V_{DD}$, a source which receives the bias current BC, and a drain connected to the drain of the transistor Tr42. The transistor Tr44 normally keeps the ON state. Accordingly, the transistors Tr42 and Tr43 form a current mirror circuit, so that when the drain current flowing through the transistor Tr42 or Tr44 varies in accordance with a change in the bias current BC, the drain current of the transistor Tr43 also changes. Further, the control signal bi1p is output from the node between the transistors Tr42 and Tr44.

A P channel MOS transistor Tr45 has a source connected to the power supply $V_{DD}$, a gate connected to its own source, and a drain connected to the drains of the transistors Tr42 and Tr44. When the control signal bi1p whose voltage is higher than the supply voltage $V_{DD}$ by a value equal to or greater than the threshold value of the transistor Tr45 is output due to the operation of the transistor Tr44, the transistor Tr45 is turned on to absorb noise included in the control signal bu1p. The N channel MOS transistor Tr46 has a drain which is connected to the drain of the transistor Tr43 and from which the control signal bi1n is output, a gate connected to its own drain and a source connected to the power supply $V_{SS}$. An N channel MOS transistor Tr47, connected in parallel to the transistor Tr46, has a gate connected to the power supply $V_{SS}$. When the control signal bi1n whose voltage is lower than the supply voltage $V_{SS}$ by a value equal to or greater than the threshold value of the transistor Tr47 is output due to the operation of the transistor Tr46, the transistor Tr47 is turned on to absorb noise included in the control signal bi1n.

When the current flowing through the transistor Tr44 becomes smaller in accordance with the bias current BC, the first bias voltage generator 128 operates in such a manner as to raise the voltage of the control signal bi1p and reduce the voltage of the control signal bi1n. When the current flowing through the transistor Tr44 further becomes smaller in accordance with the bias current BC, the first bias voltage generator 128 operates in such a manner that the voltage of each of the control signals bi1p and bi1n approaches an intermediate level between the supply voltages $V_{DD}$ and $V_{SS}$. The second bias voltage generator 129 operates in the same way as the first bias voltage generator 128 in accordance with the output signal PO.

Figure 25:
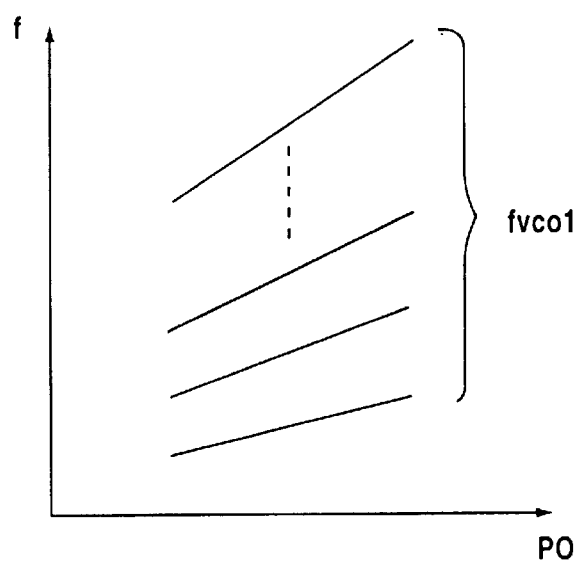
FIG. 25 is a graph showing the relationship between the frequency of an oscillation output signal from a first VCO, and the currents of output signals from charge pumps that are supplied to the first VCO.

The first VCO 123a adjusts in a stepwise manner, the bias current BC which varies in accordance with the shifting of the position of the pickup 104, and outputs the oscillation output signal $f_{VCO1}$ in accordance with the change in the bias current BC and the output signal PO from the charge pump 121a or 121b, as shown in FIG. 25. At this time, the gain of the first VCO 123a increases as the frequency of the oscillation output signal $f_{VCO1}$ becomes higher. Therefore, the inclination of the oscillation output signal $f_{VCO1}$ on the graph becomes sharper as the amount of change of the output signal PO increases.

Figure 26:
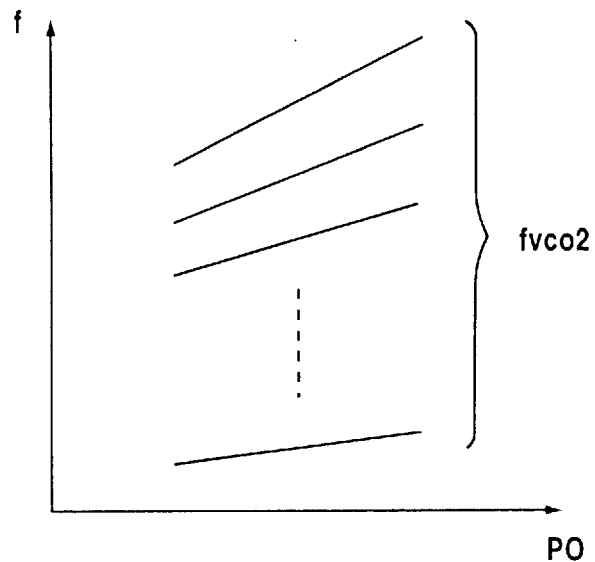
FIG. 26 is a graph showing the relationship between the frequency of an oscillation output signal from a second VCO, and the currents of output signals from the charge pumps that are supplied to the second VCO.

The second VCO 123b adjusts in a stepwise manner, the bias current BC which varies in accordance with the shifting of the position of the pickup 104, and outputs the oscillation output signal $f_{VCO2}$ in accordance with the change in the bias current BC and the output signal PO from the charge pump 121a or 121b, as shown in FIG. 26. At this time, the gain of the second VCO 123b increases as the frequency of the oscillation output signal $f_{VCO2}$ becomes higher. Therefore, the inclination of the oscillation output signal $f_{VCO2}$ on the graph becomes sharper as the amount of change of the output signal PO increases. The inclination of the oscillation output signal $f_{VCO2}$ of the second VCO 123b having a lower gain than the first VCO 123a becomes smaller than the inclination of the oscillation output signal $f_{VCO1}$ in the same output frequency range.

Figure 27:
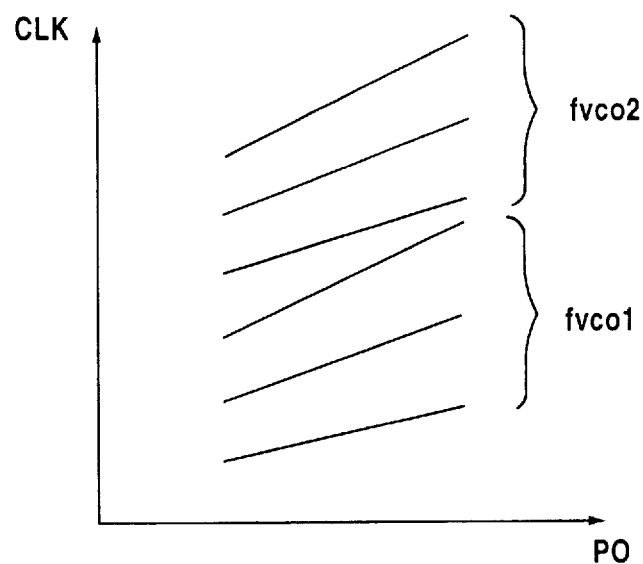
FIG. 27 is a graph showing the relationship between the frequency of a clock signal from the PLL circuit and the currents of output signals from the charge pumps.

When the pickup 104 is positioned between the intermediate position in the radial direction of the disk 103 and the inner periphery thereof (i.e., when the digital pulse signal SG4 having a low frequency is output from the comparator 107), the first VCO 123a having a relatively high gain is selected by controlling the switches 122a and 122b through the microcomputer 102. When the pickup 104 is positioned between the intermediate position in the radial direction of the disk 103 and the outer periphery thereof, (i.e., when the digital pulse signal SG4 having a high frequency is output from the comparator 107), the second VCO 123b having a relatively low gain is selected by controlling the switches 122a and 122b through the microcomputer 102. Through this selective operation, a gain variation with respect to changes in the oscillation output signals $f_{VCO1}$ and $f_{VCO2}$ can be suppressed over a wide frequency range, as shown in FIG. 27. This permits a change in the frequency of the clock signal CLK to be suppressed over a wide frequency range. Accordingly, the PLL circuit 109 in this invention advantageously supplies a stable clock signal CLK to the EFM demodulator 108 after being locked up, over the wide frequency range of the digital pulse signal SG4, and can shorten the time needed for the lock-up.

As described above, the data reading apparatus according to this invention can read data from the disk 103 where the data has been recorded in the CLV or ZCLV system while rotating the disk 103 at a substantially constant speed. Advantageously, this significantly contributes to the implementation of spindle motors "M" having reduced physical proportions, which in turn decrease the power consumption of the data reading apparatus.

Although only some embodiments of the present invention have been described herein, it should be apparent to those skilled in the art that the present invention may be embodied in many other specific forms without departing from the spirit or scope of the invention. Therefore, the present examples and embodiment are to be considered as illustrative and not restrictive and the invention is not to be limited to the details given herein, but may be modified within the scope and equivalence of the appended claims.

What is claimed is:

1. A data demodulating apparatus for demodulating an analog data signal read from a recording medium, having data recorded on at least a part of said recording medium in a substantially constant linear velocity system, said recording medium being rotated at a substantially constant speed during reading of said analog data signal such that one of a frequency and an amplitude of said read analog data signal varies, said apparatus comprising:

a signal processor for processing said read analog data signal in response to a change in one of said frequency and amplitude to produce a digital data signal suitable for demodulation, wherein said signal processor includes a variable gain amplifier for amplifying said read analog data signal to generate an amplified analog data signal having a substantially constant amplitude while adjusting a self gain in accordance with a predetermined voltage and one of the amplitude of the amplified analog data signal and information about a data reading position on said recording medium, a filter, connected to the variable gain amplifier, for filtering the amplified analog data signal while adjusting a self cutoff frequency in accordance with a shift in said data reading position, and a comparator, connected to the filter, receiving the filtered analog data signal and comparing an amplitude of the filtered analog data signal with a threshold value to generate a digital data signal while varying the threshold value in accordance with a change in one of the amplitude and the frequency of said analog data signal; and a demodulator for demodulating said digital data signal to produce a demodulated digital data signal.

2. The data demodulating apparatus according to claim 1, wherein said comparator includes an amplifier that receives said analog data signal and produces an output signal, and an integrator that receives said output signal and produces a bias voltage to be supplied to said amplifier, wherein said amplifier produces said digital data signal representing said output signal in response to said bias voltage.

3. The data demodulating apparatus according to claim 1, wherein said frequency of said data signal varies depending on a shift in a data reading position on said recording medium, and the data demodulating apparatus further comprising a phase-locked loop (PLL) circuit for receiving said digital data signal and producing an oscillation output signal while adjusting a self gain in response to a shift in said data reading position.

4. The data demodulating apparatus according to claim 3, wherein said PLL circuit includes a plurality of voltage controlled oscillators having different gains, and said PLL circuit is configured to select one of said voltage controlled oscillators to produce said oscillation output signal in response to said shift in said data reading position.

5. The data demodulating apparatus according to claim 3, wherein said PLL circuit includes at least one voltage controlled oscillator for producing an oscillation output signal while adjusting a self gain in response to a bias current that is adjusted depending on said shift in said data reading position.

6. The data demodulating apparatus according to claim 3, wherein said PLL circuit includes a plurality of voltage controlled oscillators having different gains, each of said voltage controlled oscillators produces an oscillation output signal while adjusting a self gain in response to a bias current adjusted in response to said shift in said data reading position, and said PLL circuit selects one of said voltage controlled oscillators that produces said oscillation output signal in response to said shift in said data reading position.

7. A data reading apparatus configured to read and demodulate data recorded on at least a part of a recording medium, said data being recorded in a substantially constant linear velocity system, said recording medium being rotated at a substantially constant speed during reading of said data, said apparatus comprising:

a pickup apparatus for reading data from said recording medium to produce an analog data signal such that one of a frequency and an amplitude of said read data signal varies;

a signal processor for processing said read analog data signal in response to a change in one of said frequency and amplitude to produce a digital data signal suitable for demodulation, wherein said signal processor includes a variable gain amplifier for amplifying said read analog data signal to generate an amplified analog data signal having a substantially constant amplitude while adjusting a self gain in accordance with a predetermined voltage and one of the amplitude of the amplified analog data signal and information about a data reading position on said recording medium, a filter, connected to the variable gain amplifier, for filtering the amplified analog data signal while adjusting a self cutoff frequency in accordance with a shift in said data reading position, and a comparator, connected to the filter, receiving the filtered analog data signal and comparing an amplitude of the filtered analog data signal with a threshold value to generate a digital data signal while varying the threshold value in accordance with a change in one of the amplitude and the frequency of said analog data signal; and a demodulator for demodulating said digital data signal to produce a demodulated data signal.

8. A data demodulating apparatus for demodulating an analog data signal read from a recording medium, having data recorded on at least a part of said recording medium in a substantially constant linear velocity system, said recording medium being rotated at a substantially constant speed during reading of said analog data signal such that one of a frequency and an amplitude of said read analog data signal varies depending on a shift in a data reading position on said recording medium, said apparatus comprising:

a variable gain amplifier for amplifying said read data signal to generate an amplified analog data signal having a substantially constant amplitude while adjusting a self gain in accordance with a predetermined voltage and one of the amplitude of the amplified analog data signal and information about said data reading position;

a filter for filtering said amplified analog data signal while adjusting a self cutoff frequency in response to said shift in said data reading position;

a comparator for receiving said filtered analog data signal and comparing an amplitude of the filtered analog data signal with a threshold value to generate a digital data signal while varying the threshold value in accordance with a change in one of the amplitude and the frequency of said analog data signal;

a phase-locked loop (PLL) circuit for receiving said digital data signal and producing an oscillation output signal while adjusting a self gain in response to said shift in said data reading position; and a demodulator for demodulating said digital data signal to produce a demodulated digital data signal.

9. The data demodulating apparatus according to claim 8, wherein said comparator includes an amplifier for receiving said analog data signal and producing an output signal, and an integrator that receives said output signal and produces a bias voltage that is supplied to said amplifier, wherein said amplifier produces said digital data signal representing said output signal in response to said bias voltage.

10. The data demodulating apparatus according to claim 8, wherein said PLL circuit includes a plurality of voltage controlled oscillators having different gains, and said PLL circuit selects one of said voltage controlled oscillators that produces said oscillation output signal in response to said shift in said data reading position.

11. The data demodulating apparatus according to claim 8, wherein said PLL circuit includes at least one voltage controlled oscillator that produces an oscillation output signal while adjusting a self gain in response to a bias current that is adjusted in response to said shift in said data reading position.

12. The data demodulating apparatus according to claim 8, wherein said PLL circuit includes a plurality of voltage controlled oscillators having different gains, each of said voltage controlled oscillators produce an oscillation output signal while adjusting a self gain in response to a bias current that is adjusted in response to said shift in said data reading position, and said PLL circuit selects from one of said plurality of voltage controlled oscillators that produce said oscillation output signal in response to said shift in said data reading position.

13. A data demodulating apparatus for demodulating an analog data signal read from a recording medium by a pickup device, wherein data is recorded on at least a part of the recording medium at a substantially constant linear velocity (CLV) and data is read from the recording medium at a substantially constant angular velocity (CAV) such that a frequency of the analog data signal varies and an amplitude of the analog data signal varies in response to a shift in a data reading position of the pickup device, the apparatus comprising:

a variable gain amplifier receiving the analog data signal from the pickup device and generating an amplified signal having a substantially constant amplitude;

a filter, connected to the variable gain amplifier, receiving the amplified signal and extracting a frequency component from the amplified signal;

a comparator, connected to the filter, receiving the filtered analog signal and comparing an amplitude of the filtered analog signal with a threshold value to generate a digital signal, wherein the threshold value varies in accordance with a change in the amplitude of the filtered analog signal;

a PLL circuit, connected to the comparator, receiving the digital signal and generating an oscillation output signal according to the frequency of the digital signal;

an eight-to-fourteen (EFM) demodulator, connected to the comparator and the PLL circuit, receiving the digital signal and the oscillation output signal and demodulating the digital signal using the oscillation output signal; and a decoder circuit, connected to the EFM demodulator, for decoding the demodulated digital signal to produce a decoded digital signal representing the data read from the recording medium.

14. The data demodulating apparatus of claim 13, wherein the variable gain amplifier includes:

a gain control amplifier receiving the analog data signal and generating the amplified signal;

a comparing unit receiving the amplified signal and a reference voltage, and comparing the amplified signal and the reference voltage to generate a first control signal;

a switch for selecting between the first control signal and an alternate first control signal, the selected control signal being input to the gain control amplifier to adjust an amplification factor of the gain control amplifier, and wherein the alternate first control signal is generated by a microcomputer which also receives the amplified signal and the reference voltage such that a peak amplitude value of the amplified signal coincides with the reference voltage.

15. The data demodulating apparatus of claim 13, wherein the variable gain amplifier comprises:

a gain control amplifier receiving the analog data signal and generating the amplified signal; and a comparing unit receiving the amplified signal and a reference voltage, and comparing the amplified signal and the reference voltage to generate a first control signal, wherein the first control signal is input to the gain control amplifier to adjust an amplification factor of the gain control amplifier.

16. The data demodulating apparatus of claim 13, wherein the filter receives a second control signal corresponding to position information about the pickup device and the filter controls a cutoff frequency according to a change in the frequency of the amplified signal in accordance with the second control signal.

17. The data demodulating apparatus of claim 13, wherein the comparator comprises:
   an amplifier receiving the filtered analog signal and shaping the waveform of the filtered analog signal using a threshold voltage level to generate the digital signal; and
   an integrator receiving the digital signal and generating an output signal, wherein the output signal is input to the amplifier as the threshold voltage level.

18. The data demodulating apparatus of claim 17, wherein the integrator comprises:
   an operational amplifier having an input and an output;
   a resistor connected between the operational amplifier output and the operational amplifier input; and
   a capacitor connected in parallel to the resistor.

19. The data demodulating apparatus of claim 18, wherein the operational amplifier comprises four stages of inverters connected in series which sequentially amplify the filtered analog signal, and wherein each of the inverters has a different cutoff frequency.

20. The data demodulating apparatus of claim 17, wherein the digital signal generated by the comparator has a constant duty regardless of a change in a frequency of the filtered analog signal.

21. The data demodulating apparatus of claim 17, wherein the comparator comprises:
   an amplifier circuit including a plurality of series connected inverter circuits, a first inverter circuit receiving the filtered analog signal and an offset voltage and the last inverter circuit outputting the digital signal, wherein a deviation of the duty of the digital signal is corrected in response to the offset voltage; and
   an integrator having a first input receiving the digital signal, a second input receiving one of a bias voltage and an offset voltage, and generating an output signal which is input to the first inverter circuit, and wherein a deviation of the duty of the digital signal is corrected in accordance with the offset voltage.

22. A data demodulating apparatus for demodulating an analog data signal read from a recording medium by a pickup device, wherein data is recorded on at least a part of the recording medium at a substantially constant linear velocity (CLV) and data is read from the recording medium at a substantially constant angular velocity (CAV) such that a frequency of the analog data signal varies and an amplitude of the analog data signal varies in response to a shift in a data reading position of the pickup device, the apparatus comprising:
   a variable gain amplifier including a gain control amplifier receiving the analog data signal from the pickup device and generating an amplified signal having a substantially constant amplitude;
   a comparing unit receiving the amplified signal from the gain control amplifier and a reference voltage, and comparing the amplified signal and the reference voltage to generate a first control signal;
   a switch for selecting between the first control signal and an alternate first control signal, the selected control signal being input to the gain control amplifier to adjust an amplification factor thereof, wherein the alternate first control signal is generated by a microcomputer which also receives the amplified signal and the reference voltage such that a peak amplitude value of the amplified signal coincides with the reference voltage;
   a filter, connected to the variable gain amplifier, receiving the amplified signal and a second control signal corresponding to position information about the pickup device and extracting a frequency component from the amplified signal, wherein the filter controls a cutoff frequency according to a change in the frequency of the amplified signal in accordance with the second control signal;
   a comparator, connected to the filter, receiving the filtered analog signal and comparing an amplitude of the filtered signal with a threshold value to generate a digital signal, the comparator including an amplifier receiving the filtered analog signal and shaping a waveform thereof using a threshold voltage level to generate the digital signal and an integrator receiving the digital signal and generating an output signal, wherein the output signal is input to the amplifier as the threshold voltage level, and wherein the threshold value varies in accordance with a change in the amplitude of the filtered analog signal;
   a PLL circuit, connected to the comparator, receiving the digital signal and generating an oscillation output signal according to the frequency of the digital signal;
   an eight-to-fourteen (EFM) demodulator, connected to the comparator and the PLL circuit, receiving the digital signal and the oscillation output signal and demodulating the digital signal using the oscillation output signal; and
   a decoder circuit, connected to the EFM demodulator, for decoding the demodulated digital signal to produce a decoded digital signal representing the data read from the recording medium.

23. A method of demodulating a data signal read from a recording medium such that data is recorded on at least a part of said recording medium and is recorded in accordance with a substantially constant linear velocity system, said method comprising the steps of:
   rotating said recording medium at a substantially constant speed;
   reading data from said recording medium in an analog signal form such that at least one of a frequency and an amplitude of said read analog signal is configured to vary based on a data reading position on said recording medium;
   amplifying said analog signal to generate an amplified analog data signal having a substantially constant amplitude by adjusting a gain in accordance with a predetermined voltage and one of the amplitude of the amplified analog data signal and information about said data reading position;
   filtering the amplified analog signal by adjusting a cutoff frequency in accordance with a shift in said data reading position;
   comparing an amplitude of the filtered analog signal with a threshold value to generate a digital data signal by varying the threshold value in accordance with a change in one of the amplitude and the frequency of said analog signal;
   converting said analog signal to a digital pulse signal while maintaining said frequency of said analog signal; and
   demodulating said digital pulse signal to produce demodulate data.

* * * * *